(12) United States Patent
Fullerton et al.

(10) Patent No.: US 7,812,698 B2
(45) Date of Patent: Oct. 12, 2010

(54) CORRELATED MAGNETIC SUIT AND METHOD FOR USING THE CORRELATED MAGNETIC SUIT

(75) Inventors: Larry W. Fullerton, New Hope, AL (US); Mark D. Roberts, Huntsville, AL (US)

(73) Assignee: Cedar Ridge Research, LLC., New Hope, AL (US)

( * ) Notice: Subject to any disclaimer, the term of this patent is extended or adjusted under 35 U.S.C. 154(b) by 0 days.

(21) Appl. No.: 12/479,820

(22) Filed: Jun. 7, 2009

(65) Prior Publication Data

US 2009/0288244 A1 Nov. 26, 2009

Related U.S. Application Data

(63) Continuation-in-part of application No. 12/476,952, filed on Jun. 2, 2009.

(51) Int. Cl.
*H01F 7/02* (2006.01)
*H01F 7/20* (2006.01)
*B64G 6/00* (2006.01)
*B63C 11/04* (2006.01)
*B63C 11/10* (2006.01)

(52) U.S. Cl. .............................. 335/306; 2/2.11; 2/2.15; 2/2.17; 335/285

(58) Field of Classification Search ............. 2/102–103, 2/312, 315, 319, 321, 322, 338, 422, 462, 2/913, 2.11, 2.15, 2.17; 335/285, 302–306; 24/303
See application file for complete search history.

(56) References Cited

U.S. PATENT DOCUMENTS

| 381,968 | A | 5/1888 | Tesla |
|---|---|---|---|
| 493,858 | A | 3/1893 | Edison |
| 996,933 | A | 7/1911 | Lindquist |
| 1,236,234 | A | 8/1917 | Troje |
| 2,389,298 | A | 11/1945 | Ellis |
| 2,570,625 | A | 10/1951 | Zimmerman et al. |
| 2,722,617 | A | 11/1955 | Cluwen et al. |
| 2,932,545 | A | 4/1960 | Foley |
| 3,102,314 | A | 9/1963 | Alderfer |
| 3,208,296 | A | 9/1965 | Baermann |
| 3,288,511 | A | 11/1966 | Tavano |

(Continued)

FOREIGN PATENT DOCUMENTS

FR 823395 1/1938

(Continued)

OTHER PUBLICATIONS

"BNS Series-Compatible Series AES Safety Controllers" pp. 1-17, http://www.schmersalusa.com/safety_controllers/drawings/aes.pdf (downloaded on or before Jan. 23, 2009).

(Continued)

*Primary Examiner*—Ramon M Barrera
(74) *Attorney, Agent, or Firm*—William J. Tucker

(57) ABSTRACT

A suit is described herein which incorporates correlated magnets that enable an object (e.g., tool, equipment bag, hood, glove, boot, flipper) to be secured thereto and removed therefrom. Some examples of such a suit include a scuba suit, a construction suit, a bio-hazard suit, a medical suit, a fire fighter suit, and an astronaut suit.

23 Claims, 16 Drawing Sheets

U.S. PATENT DOCUMENTS

| | | | |
|---|---|---|---|
| 3,468,576 | A | 9/1969 | Beyer et al. |
| 3,474,366 | A | 10/1969 | Barney |
| 3,802,034 | A | 4/1974 | Bookless |
| 4,079,558 | A | 3/1978 | Gorham |
| 4,222,489 | A | 9/1980 | Hutter |
| 4,453,294 | A | 6/1984 | Morita |
| 4,547,756 | A | 10/1985 | Miller et al. |
| 4,629,131 | A | 12/1986 | Podell |
| 4,941,236 | A | 7/1990 | Sherman |
| 5,050,276 | A | 9/1991 | Pemberton |
| 5,367,891 | A | 11/1994 | Furuyama |
| 5,383,049 | A | 1/1995 | Carr |
| 5,631,093 | A | 5/1997 | Perry et al. |
| 5,631,618 | A | 5/1997 | Trumper et al. |
| 6,072,251 | A | 6/2000 | Markle |
| 6,170,131 | B1 | 1/2001 | Shin |
| 6,275,778 | B1 | 8/2001 | Shimada et al. |
| 6,457,179 | B1 | 10/2002 | Prendergast |
| 6,607,304 | B1 | 8/2003 | Lake et al. |
| 6,720,698 | B2 | 4/2004 | Galbraith |
| 6,847,134 | B2 | 1/2005 | Frissen et al. |
| 6,862,748 | B2 | 3/2005 | Prendergast |
| 6,927,657 | B1 | 8/2005 | Wu |
| 6,971,147 | B2 | 12/2005 | Halstead |
| 7,066,778 | B2 | 6/2006 | Kretzschmar |
| 7,320,158 | B2 * | 1/2008 | Deto et al. .................... 24/303 |
| 7,362,018 | B1 | 4/2008 | Kulogo et al. |
| 7,444,683 | B2 | 11/2008 | Prendergast et al. |
| 7,631,363 | B2 * | 12/2009 | Myerscough ................. 2/2.15 |
| 2004/0003487 | A1 | 1/2004 | Reiter |
| 2006/0066428 | A1 | 3/2006 | McCarthy et al. |
| 2006/0189259 | A1 | 8/2006 | Park |
| 2006/0290451 | A1 | 12/2006 | Prendergast et al. |
| 2008/0186683 | A1 | 8/2008 | Ligtenberg et al. |
| 2008/0272868 | A1 | 11/2008 | Prendergast et al. |
| 2008/0282517 | A1 | 11/2008 | Claro |

FOREIGN PATENT DOCUMENTS

WO    2007081830 A2    7/2007

OTHER PUBLICATIONS

"Magnetic Safety Sensors" pp. 1-3, http://farnell.com/datasheets/6465.pdf (downloaded on or before Jan. 23, 2009).

"Series BNS-B20 Coded-Magnet Sensor Safety Door Handle" pp. 1-2, http://www.schmersalusa.com/catalog_pdfs/BNS_B20.pdf (downloaded on or before Jan. 23, 2009).

"Series BNS333 Coded-Magnet Sensors with Integrated Safety Control Module", pp. 1-2, http://www.schmersalusa.com/machine_guarding/coded_magnet/drawings/bns333.pdf (downloaded on or before Jan. 23, 2009).

* cited by examiner

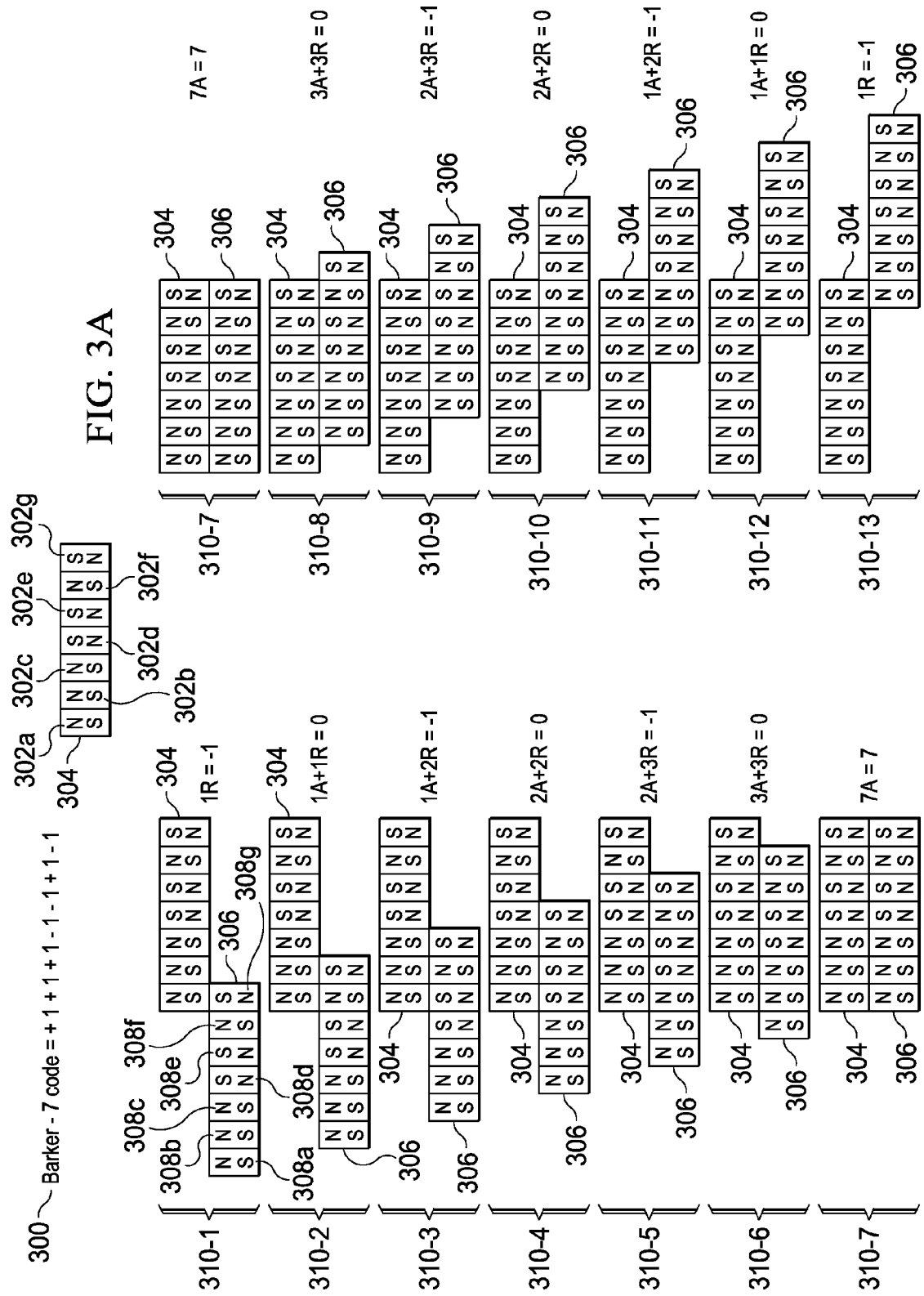

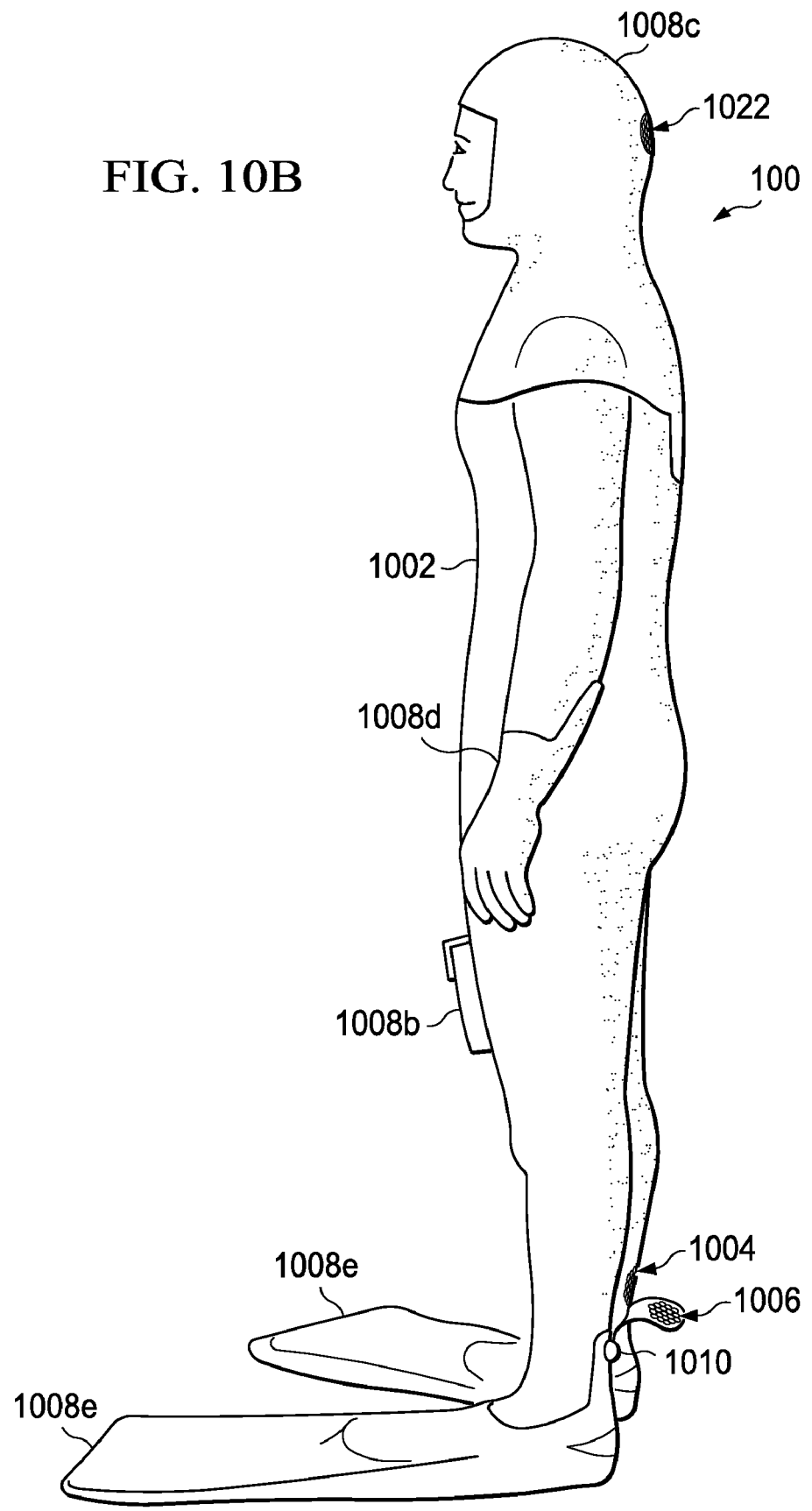

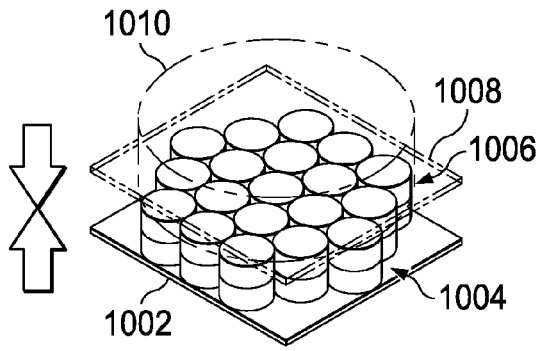
FIG. 11A
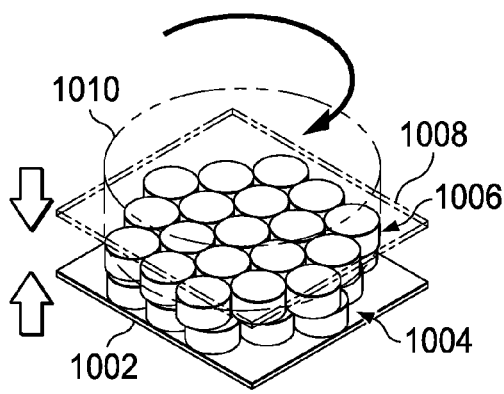
FIG. 11B
FIG. 11C
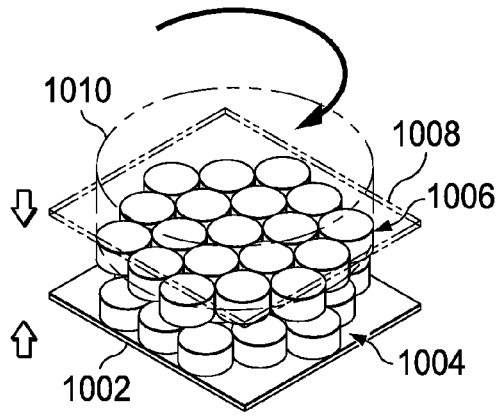
FIG. 11D
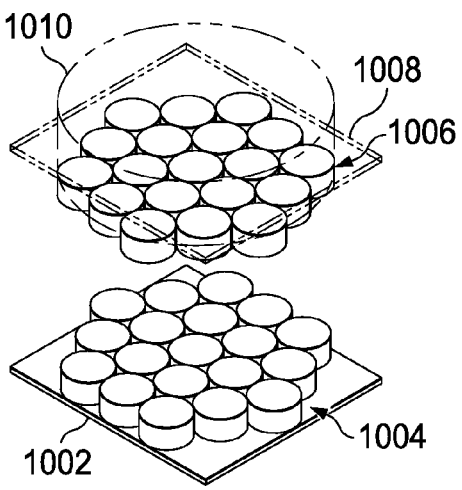
FIG. 11E
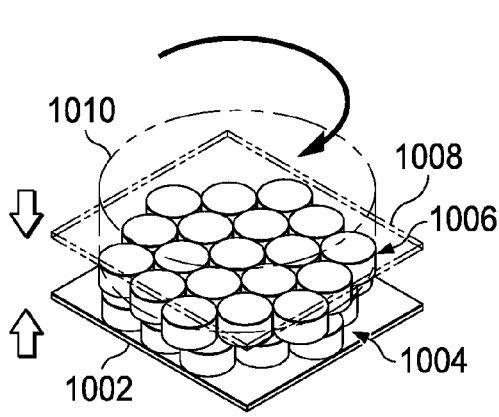
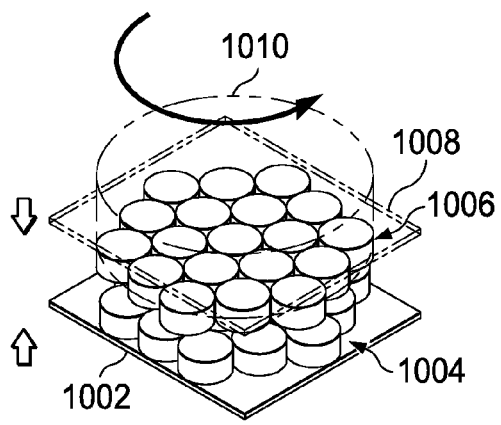
FIG. 11F

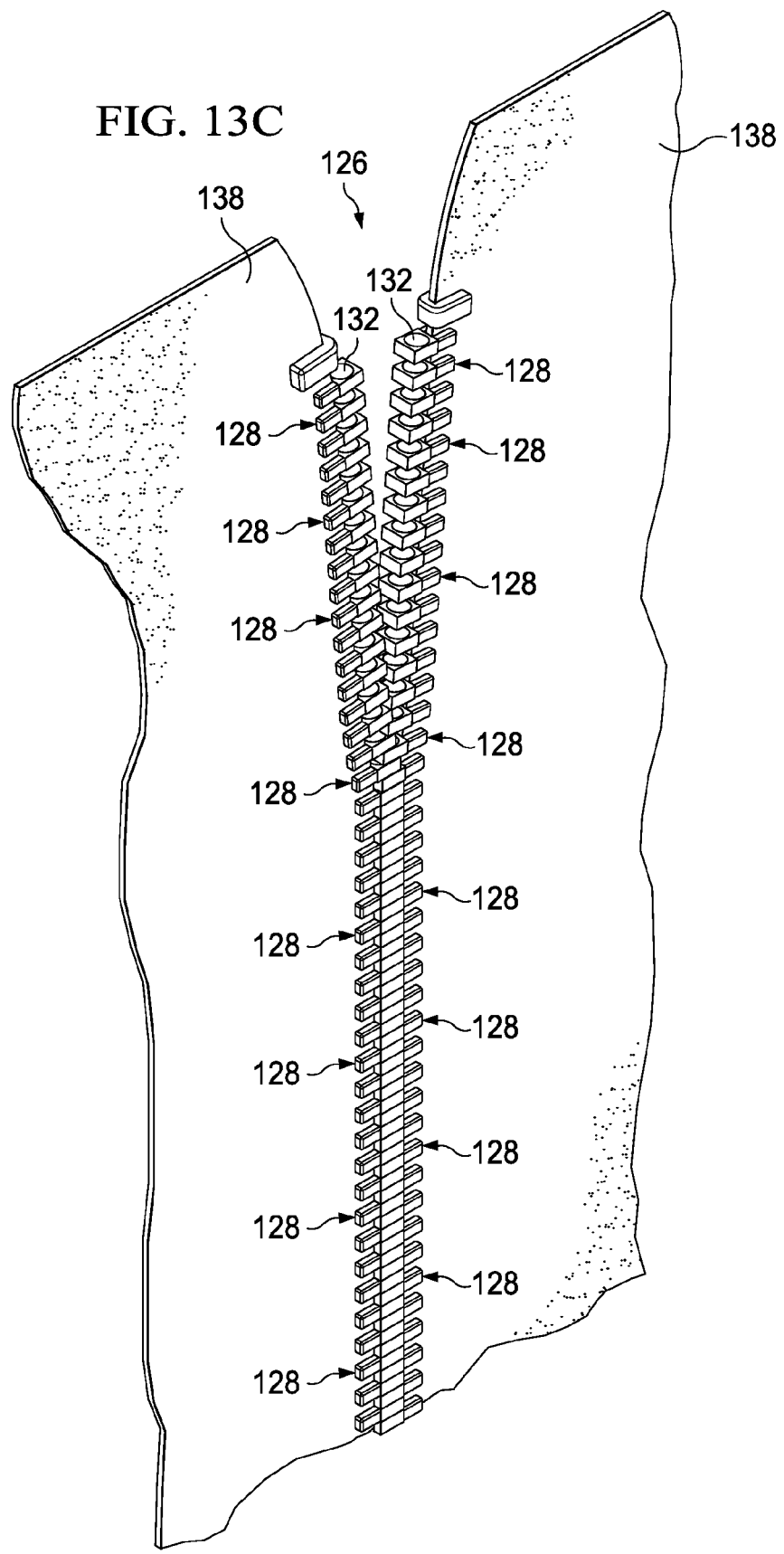

CORRELATED MAGNETIC SUIT AND METHOD FOR USING THE CORRELATED MAGNETIC SUIT

CROSS REFERENCE TO RELATED APPLICATION

This application is a continuation-in-part application of U.S. patent application Ser. No. 12/476,952 filed on Jun. 2, 2009 and entitled "A Field Emission System and Method", which is a continuation-in-part application of U.S. patent application Ser. No. 12/322,561 filed on Feb. 4, 2009 and entitled "A System and Method for Producing an Electric Pulse", which is a continuation-in-part application of U.S. patent application Ser. No. 12/358,423 filed on Jan. 23, 2009 and entitled "A Field Emission System and Method", which is a continuation-in-part application of U.S. patent application Ser. No. 12/123,718 filed on May 20, 2008 and entitled "A Field Emission System and Method". The contents of these four documents are hereby incorporated herein by reference.

TECHNICAL FIELD

The present invention is related to a suit which incorporates correlated magnets that enable an object (e.g., tool, equipment bag, hood, glove, boot, flipper) to be secured thereto and removed therefrom. Some examples of such a suit include a scuba suit, a construction suit, a bio-hazard suit, a medical suit, a fire fighter suit, and an astronaut suit. The present invention is demonstrated using a scuba suit (e.g., scuba wetsuit, scuba drysuit).

DESCRIPTION OF RELATED ART

In an underwater environment, for example, it would be desirable to provide a person with a scuba suit (e.g., scuba wetsuit, scuba drysuit) that makes it easy for them to secure one or more objects (e.g., tool, equipment bag, hood, glove, boot, flipper) thereto and remove the objects therefrom regardless if they are above water or underwater. Unfortunately, the traditional scuba suit may employ loops, buckles, clamps, hooks, or other known fastening mechanisms which require a great degree of dexterity on the part of the person to use when they want to secure objects thereto and remove objects therefrom. Accordingly, there has been a need for a new type of scuba suit which addresses the aforementioned shortcoming and other shortcomings associated with the traditional scuba suit. In addition, there is a need for a new type of suit that can be used in other environments like construction, bio-hazard, medical, fire fighting, military and space that makes it easy for a person to secure objects thereto and remove objects therefrom. These needs and other needs are satisfied by the present invention.

SUMMARY

In one aspect, the present invention provides a suit adapted to have an object secured thereto and the object removed therefrom. The suit has a protective material including a first field emission structure which interacts with a second field emission structure associated with the object. The object is attached to the protecting material when the first and second field emission structures are located next to one another and have a certain alignment with respect to one another. The object is released from the protective material when the first field emission structure and the second field emission structures are turned with respect to one another. Each of the first and second field emission structures include a plurality of field emission sources having positions and polarities relating to a desired spatial force function that corresponds to a relative alignment of the first and second field emission structures within a field domain. This is possible because each of the field emission sources has a corresponding field emission amplitude and vector direction determined in accordance with the desired spatial force function, wherein a separation distance between the first and second field emission structures and the relative alignment of the first and second field emission structures creates a spatial force in accordance the desired spatial force function. The field domain corresponds to first field emissions from the first field emission sources of the first field emission structure interacting with second field emissions from the second field emission sources of the second field emission structure.

In another aspect, the present invention provides a method enabling an object to be attached to and removed from a suit. The method including the steps of: (a) attaching a first field emission structure to the suit; (b) attaching a second field emission structure to the object; and (c) aligning the first and second field emission structures so the object attaches to the suit when the first and second field emission structures are located next to one another, where each of the first and second field emission structures include a plurality of field emission sources having positions and polarities relating to a desired spatial force function that corresponds to a relative alignment of the first and second field emission structures within a field domain.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein:

FIGS. 10A-10C are diagrams of an exemplary correlated magnetic suit (e.g., scuba wetsuit, scuba drysuit) in accordance with an embodiment of the present invention;

FIGS. 11A-11I are several diagrams that illustrate a portion of the scuba suit which are used to show how an exemplary first magnetic field emission structure (attached to the protective material) and its mirror image second magnetic field emission structure (attached to an object) can be aligned or misaligned relative to each other to enable one to secure or remove the object from the protective material in accordance with an embodiment of the present invention;

FIGS. 13A-13D are diagrams of an exemplary correlated magnetic zipper that can be used in the scuba suit shown in FIGS. 10A-10C in accordance with an embodiment of the present invention.

DETAILED DESCRIPTION

The present invention includes a suit (e.g. scuba suit, a construction suit, a bio-hazard suit, a medical suit, a fire fighter suit, an astronaut suit) which utilizes correlated magnetic technology to enable a wide variety of objects (e.g., tools, hoods, gloves, boots, flippers) to be easily connected thereto and removed therefrom. The suit which utilizes correlated magnetic technology is a significant improvement over a conventional suit which employs loops, buckles, clamps, hooks, or other known fastening devices to enable the connection and removal of objects (e.g., tools, hoods, gloves, boots, flippers). This significant improvement over the state-of-art is attributable, in part, to the use of an emerging, revolutionary technology that is called correlated magnetics.

This revolutionary technology referred to herein as correlated magnetics was first fully described and enabled in the co-assigned U.S. patent application Ser. No. 12/123,718 filed on May 20, 2008 and entitled "A Field Emission System and Method". The contents of this document are hereby incorporated herein by reference. A second generation of a correlated magnetic technology is described and enabled in the co-assigned U.S. patent application Ser. No. 12/358,423 filed on Jan. 23, 2009 and entitled "A Field Emission System and Method". The contents of this document are hereby incorporated herein by reference. A third generation of a correlated magnetic technology is described and enabled in the co-assigned U.S. patent application Ser. No. 12/476,952 filed on Jun. 2, 2009 and entitled "A Field Emission System and Method". The contents of this document are hereby incorporated herein by reference. Another technology known as correlated inductance, which is related to correlated magnetics, has been described and enabled in the co-assigned U.S. patent application Ser. No. 12/322,561 filed on Feb. 4, 2009 and entitled "A System and Method for Producing and Electric Pulse". The contents of this document are hereby incorporated by reference. A brief discussion about correlated magnetics is provided first before a detailed discussion is provided about the correlated magnetic suit of the present invention.

Correlated Magnetics Technology

This section is provided to introduce the reader to basic magnets and the new and revolutionary correlated magnetic technology. This section includes subsections relating to basic magnets, correlated magnets, and correlated electromagnetics. It should be understood that this section is provided to assist the reader with understanding the present invention, and should not be used to limit the scope of the present invention.

A. Magnets

Figure 1:
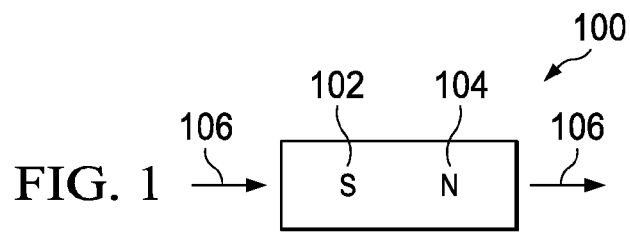
FIGS. 1-9 are various diagrams used to help explain different concepts about correlated magnetic technology which can be utilized in an embodiment of the present invention.

A magnet is a material or object that produces a magnetic field which is a vector field that has a direction and a magnitude (also called strength). Referring to FIG. 1, there is illustrated an exemplary magnet 100 which has a South pole 102 and a North pole 104 and magnetic field vectors 106 that represent the direction and magnitude of the magnet's moment. The magnet's moment is a vector that characterizes the overall magnetic properties of the magnet 100. For a bar magnet, the direction of the magnetic moment points from the South pole 102 to the North pole 104. The North and South poles 104 and 102 are also referred to herein as positive (+) and negative (−) poles, respectively.

Figure 2A:
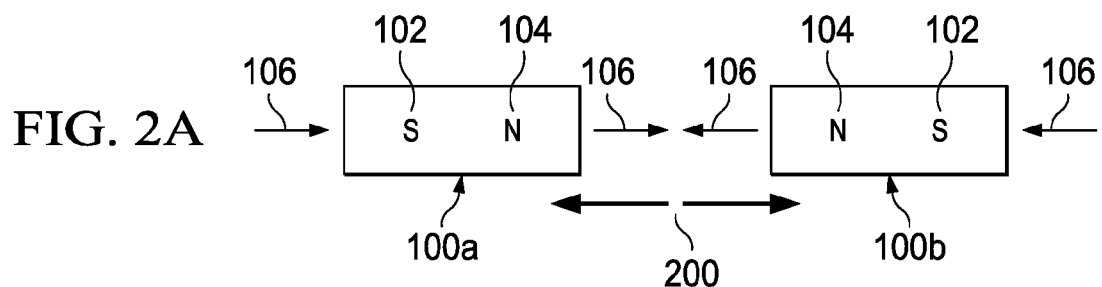
Figure 2B:
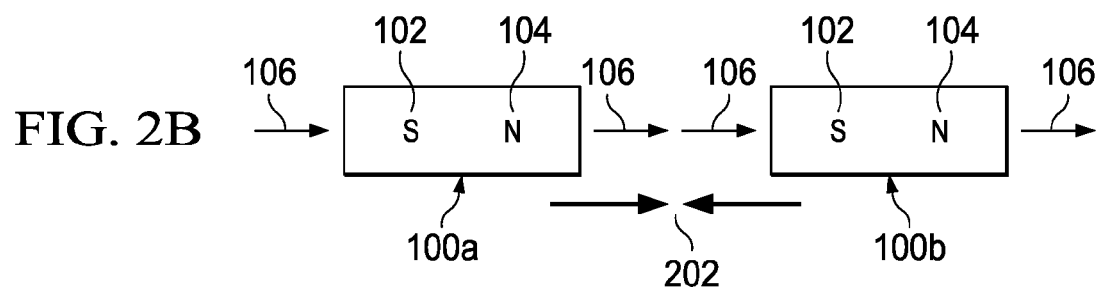
Figure 2C:
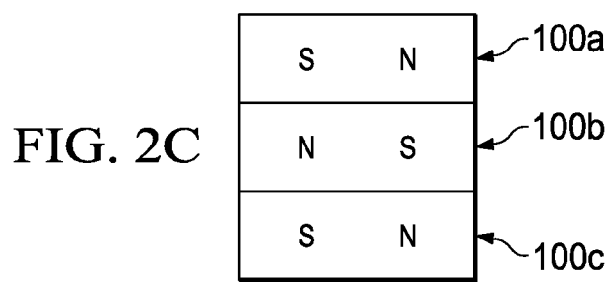

Referring to FIG. 2A, there is a diagram that depicts two magnets 100a and 100b aligned such that their polarities are opposite in direction resulting in a repelling spatial force 200 which causes the two magnets 100a and 100b to repel each other. In contrast, FIG. 2B is a diagram that depicts two magnets 100a and 100b aligned such that their polarities are in the same direction resulting in an attracting spatial force 202 which causes the two magnets 100a and 100b to attract each other. In FIG. 2B, the magnets 100a and 100b are shown as being aligned with one another but they can also be partially aligned with one another where they could still "stick" to each other and maintain their positions relative to each other. FIG. 2C is a diagram that illustrates how magnets 100a, 100b and 100c will naturally stack on one another such that their poles alternate.

B. Correlated Magnets

Correlated magnets can be created in a wide variety of ways depending on the particular application as described in the aforementioned U.S. patent application Ser. Nos. 12/123, 718, 12/358,432, and 12/476,952 by using a unique combination of magnet arrays (referred to herein as magnetic, field emission sources), correlation theory (commonly associated with probability theory and statistics) and coding theory (commonly associated with communication systems). A brief discussion is provided next to explain how these widely diverse technologies are used in a unique and novel way to create correlated magnets.

Basically, correlated magnets are made from a combination of magnetic (or electric) field emission sources which have been configured in accordance with a pre-selected code having desirable correlation properties. Thus, when a magnetic field emission structure is brought into alignment with a complementary, or mirror image, magnetic field emission structure the various magnetic field emission sources will all align causing a peak spatial attraction force to be produced, while the misalignment of the magnetic field emission structures cause the various magnetic field emission sources to substantially cancel each other out in a manner that is a function of the particular code used to design the two magnetic field emission structures, in contrast, when a magnetic field emission structure is brought into alignment with a duplicate magnetic field emission structure then the various magnetic field emission sources all align causing a peak spatial repelling force to be produced, while the misalignment of the magnetic field emission structures causes the various magnetic field emission sources to substantially cancel each other out in a manner that is a function of the particular code used to design the two magnetic field emission structures.

The aforementioned spatial forces (attraction, repelling) have a magnitude that is a function of the relative alignment of two magnetic field emission structures and their corresponding spatial force (or correlation) function, the spacing (or distance) between the two magnetic field emission structures, and the magnetic field strengths and polarities of the various sources making up the two magnetic field emission structures. The spatial force functions can be used to achieve precision alignment and precision positioning not possible with basic magnets. Moreover, the spatial force functions can enable the precise control of magnetic fields and associated spatial forces thereby enabling new forms of attachment devices for attaching objects with precise alignment and new systems and methods for controlling precision movement of objects. An additional unique characteristic associated with correlated magnets relates to the situation where the various magnetic field sources making-up two magnetic field emission structures can effectively cancel out each other when they are brought out of alignment which is described herein as a release force. This release force is a direct result of the particular correlation coding used to configure the magnetic field emission structures.

A person skilled in the art of coding theory will recognize that there are many different types of codes that have different correlation properties which have been used in communications for channelization purposes, energy spreading, modulation, and other purposes. Many of the basic characteristics of such codes make them applicable for use in producing the magnetic field emission structures described herein. For example, Barker codes are known for their autocorrelation properties and can be used to help configure correlated magnets. Although, a Barker code is used in an example below with respect to FIGS. 3A-3B, other forms of codes which may or may not be well known in the art are also applicable to correlated magnets because of their autocorrelation, cross-correlation, or other properties including, for example, Gold codes, Kasami sequences, hyperbolic congruential codes, quadratic congruential codes, linear congruential codes, Welch-Costas array codes, Golomb-Costas array codes, pseudorandom codes, chaotic codes. Optimal Golomb Ruler codes, deterministic codes, designed codes, one dimensional codes, two dimensional codes, three dimensional codes, or four dimensional codes, combinations thereof, and so forth.

Referring to FIG. 3A, there are diagrams used to explain how a Barker length 7 code 300 can be used to determine polarities and positions of magnets 302a, 302b . . . 302g making up a first magnetic field emission structure 304. Each magnet 302a, 302b . . . 302g has the same or substantially the same magnetic field strength (or amplitude), which for the sake of this example is provided as a unit of 1 (where A=Attract, R=Repel, A=−R, A=1, R=−1). A second magnetic field emission structure 306 (including magnets 308a, 308b . . . 308g) that is identical to the first magnetic field emission structure 304 is shown in 13 different alignments 310-1 through 310-13 relative to the first magnetic field emission structure 304. For each relative alignment the number of magnets that repel plus the number of magnets that attract is calculated, where each alignment has a spatial force in accordance with a spatial force function based upon the correlation function and magnetic field strengths of the magnets 302a, 302b . . . 302g and 308a, 308b . . . 308g. With the specific Barker code used, the spatial force varies from −1 to 7, where the peak, occurs when the two magnetic field emission structures 304 and 306 are aligned which occurs when their respective codes are aligned. The off peak spatial force, referred to as a side lobe force, varies from 0 to −1. As such, the spatial force function causes the magnetic field emission structures 304 and 306 to generally repel each other unless they are aligned such that each of their magnets are correlated with a complementary magnet (i.e., a magnet's South pole aligns with another magnet's North pole, or vice versa). In other words, the two magnetic field emission structures 304 and 306 substantially correlate with one another when they are aligned to substantially mirror each other.

Figure 3B:
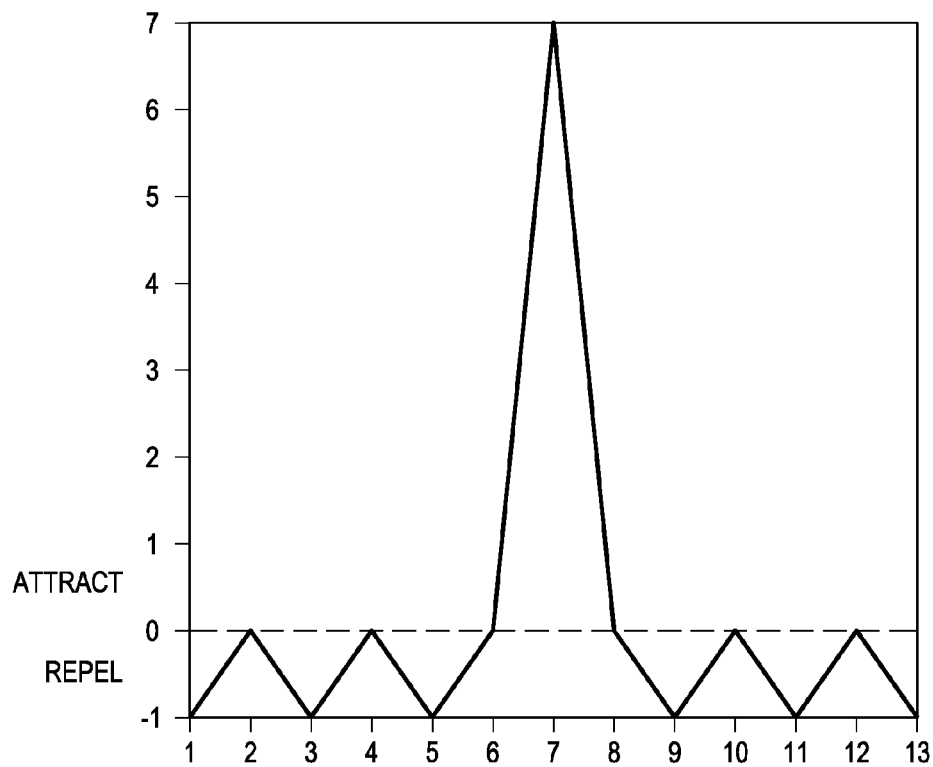

In FIG. 3B, there is a plot that depicts the spatial force function of the two magnetic field emission structures 304 and 306 which results from the binary autocorrelation function of the Barker length 7 code 300, where the values at each alignment position 1 through 13 correspond to the spatial force values that were calculated for the thirteen alignment positions 310-1 through 310-13 between the two magnetic field emission structures 304 and 306 depicted in FIG. 3A. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures 304 and 306 will be complementary to (i.e., mirror images of) each other. This complementary autocorrelation relationship can be seen in FIG. 3A where the bottom face of the first magnetic field emission structure 304 having the pattern 'S S S N N S N' is shown interacting with the top face of the second magnetic field emission structure 306 having the pattern 'N N N S S N S', which is the mirror image (pattern) of the bottom face of the first magnetic field emission structure 304.

Figure 4A:
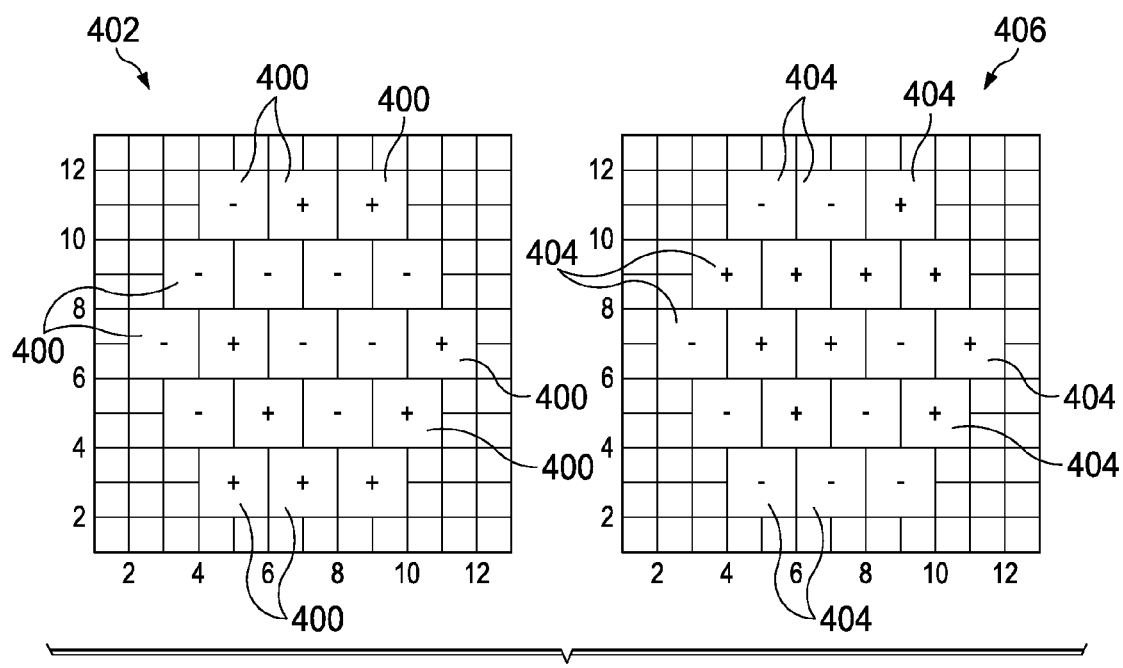
Figure 4B:
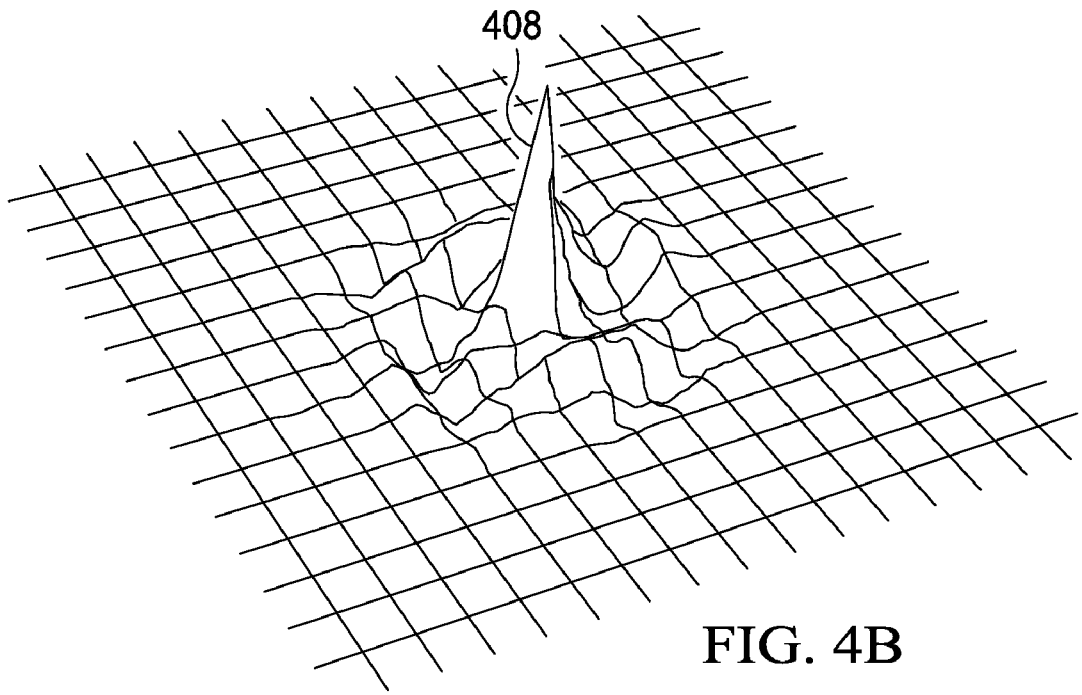
Figure 4C:
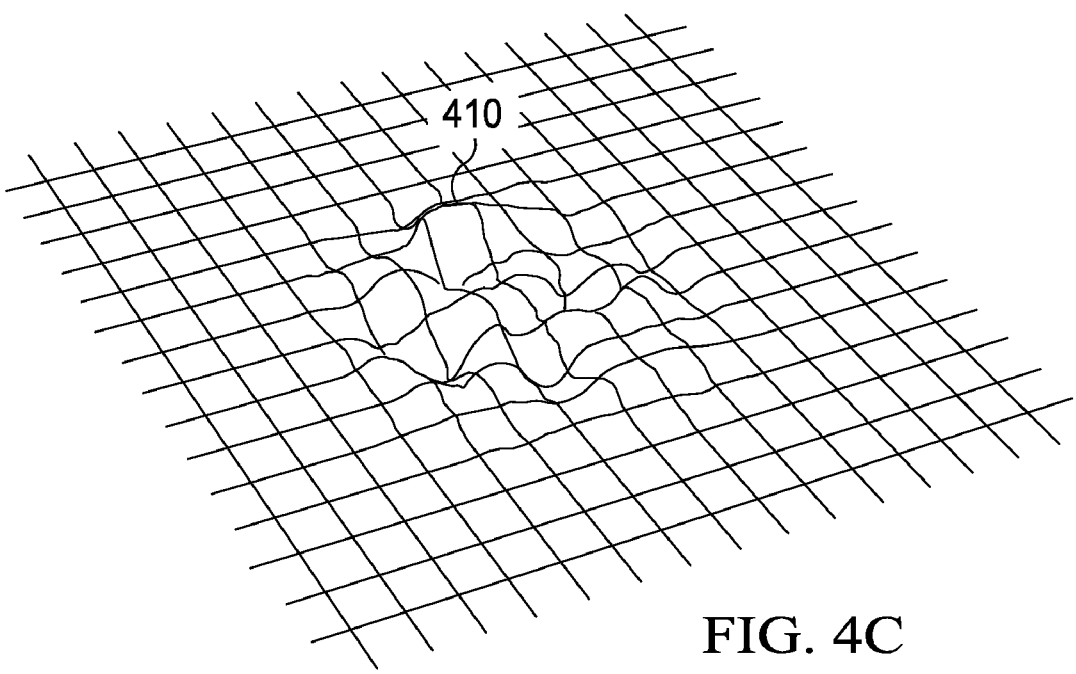

Referring to FIG. 4A, there is a diagram of an array of 19 magnets 400 positioned in accordance with an exemplary code to produce an exemplary magnetic field emission structure 402 and another array of 19 magnets 404 which is used to produce a mirror image magnetic field emission structure 406. In this example, the exemplary code was intended to produce the first magnetic field emission structure 402 to have a first stronger lock when aligned with its mirror image magnetic field emission structure 406 and a second weaker lock when it is rotated 90° relative to its mirror image magnetic field emission structure 406, FIG. 4B depicts a spatial force function 408 of the magnetic field emission structure 402 interacting with its mirror image magnetic field emission structure 406 to produce the first stronger lock. As can be seen, the spatial force function 408 has a peak which occurs when the two magnetic field emission structures 402 and 406 are substantially aligned. FIG. 4C depicts a spatial force function 410 of the magnetic field emission structure 402 interacting with its mirror magnetic field emission structure 406 after being rotated 90°. As can be seen, the spatial force function 410 has a smaller peak which occurs when the two magnetic field emission structures 402 and 406 are substantially aligned but one structure is rotated 90°. If the two magnetic field emission structures 402 and 406 are in other positions then they could be easily separated.

Figure 5:
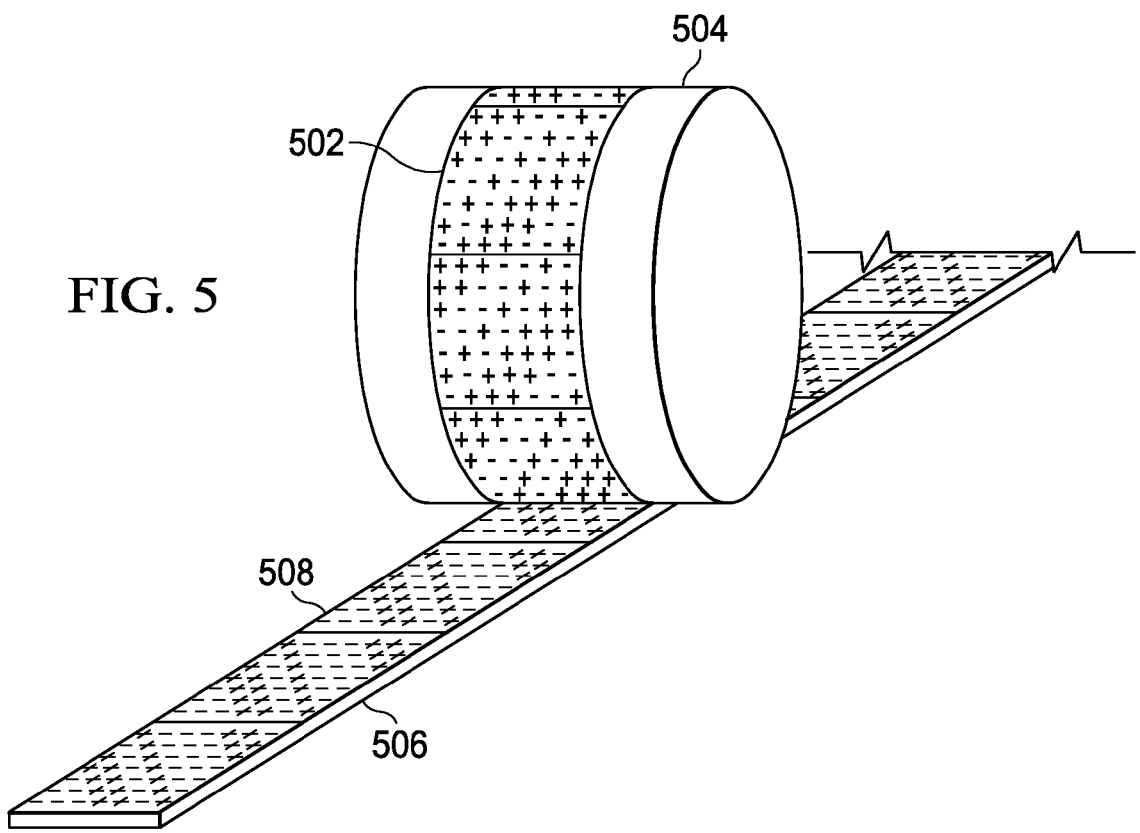

Referring to FIG. 5, there is a diagram depicting a correlating magnet surface 502 being wrapped back on itself on a cylinder 504 (or disc 504, wheel 504) and a conveyor belt/tracked structure 506 having located thereon a mirror image correlating magnet surface 508. In this case, the cylinder 504 can be turned clockwise or counter-clockwise by some force so as to roll along the conveyor belt/tracked structure 506. The fixed magnetic field emission structures 502 and 508 provide a traction and gripping (i.e., holding) force as the cylinder 504 is turned by some other mechanism (e.g., a motor). The gripping force would remain substantially constant as the cylinder 504 moved down the conveyor belt/tracked structure 506 independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures 502 and 508. If desired, this cylinder 504 (or other rotary devices) can also be operated against other rotary correlating surfaces to provide a gear-like operation. Since the hold-down force equals the traction force, these gears can be loosely connected and still give positive, non-slipping rotational accuracy. Plus, the magnetic field emission structures 502 and 508 can have surfaces which are perfectly smooth and still provide positive, non-slip traction, in contrast to legacy friction-based wheels, the traction force provided by the magnetic field emission structures 502 and 508 is largely independent of the friction forces between the traction wheel and the traction surface and can be employed with low friction surfaces. Devices moving about based on magnetic traction can be operated independently of gravity for example in weightless conditions including space, underwater, vertical surfaces and even upside down.

Figure 6:
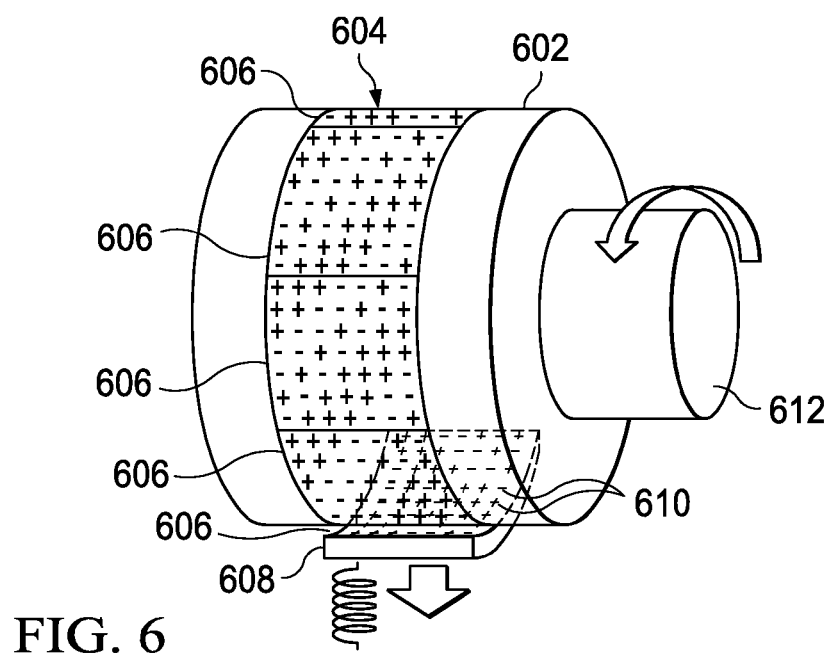

Referring to FIG. 6, there is a diagram depicting an exemplary cylinder 602 having wrapped thereon a first magnetic field emission structure 604 with a code pattern 606 that is repeated six times around the outside of the cylinder 602. Beneath the cylinder 602 is an object 608 having a curved surface with a slightly larger curvature than the cylinder 602 and having a second magnetic field emission structure 610 that is also coded using the code pattern 606. Assume, the cylinder 602 is turned at a rotational rate of 1 rotation per second by shaft 612. Thus, as the cylinder 602 turns, six times a second the first magnetic field emission structure 604 on the cylinder 602 aligns with the second magnetic field emission structure 610 on the object 608 causing the object 608 to be repelled (i.e., moved downward) by the peak spatial force function of the two magnetic field emission structures 604 and 610. Similarly, had the second magnetic field emission structure 610 been coded using a code pattern that mirrored code pattern 606, then 6 times a second the first magnetic field emission structure 604 of the cylinder 602 would align with the second magnetic field emission structure 610 of the object 608 causing the object 608 to be attracted (i.e., moved upward) by the peak spatial force function of the two magnetic field emission structures 604 and 610. Thus, the movement of the cylinder 602 and the corresponding first magnetic field emission structure 604 can be used to control the movement of the object 608 having its corresponding second magnetic field emission structure 610. One skilled in the art will recognize that the cylinder 602 may be connected to a shaft 612 which may be turned as a result of wind turning a windmill, a water wheel or turbine, ocean wave movement, and other methods whereby movement of the object 608 can result from some source of energy scavenging. As such, correlated magnets enables the spatial forces between objects to be precisely controlled in accordance with their movement and also enables the movement of objects to be precisely controlled in accordance with such spatial forces.

In the above examples, the correlated magnets 304, 306, 402, 406, 502, 508, 604 and 610 overcome the normal 'magnet orientation' behavior with the aid of a holding mechanism such as an adhesive, a screw, a bolt & nut, etc. In other cases, magnets of the same magnetic field emission structure could be sparsely separated from other magnets (e.g., in a sparse array) such that the magnetic forces of the individual magnets do not substantially interact, in which case the polarity of individual magnets can be varied in accordance with a code without requiring a holding mechanism to prevent magnetic forces from 'flipping' a magnet. However, magnets are typically close enough to one another such that their magnetic forces would substantially interact to cause at least one of them to 'flip' so that their moment vectors align but these magnets can be made to remain in a desired orientation by use of a holding mechanism such as an adhesive, a screw, a bolt & nut, etc. . . . As such, correlated magnets often utilize some sort, of holding mechanism to form different magnetic field emission structures which can be used in a wide-variety of applications like, for example, a turning mechanism, a tool insertion slot, alignment marks, a latch mechanism, a pivot mechanism, a swivel mechanism, a lever, a drill head assembly, a hole cutting tool assembly, a machine press tool a gripping apparatus, a slip ring mechanism, and a structural assembly.

C. Correlated Electromagnetics

Correlated magnets can entail the use of electromagnets which is a type of magnet in which the magnetic field is produced by the flow of an electric current. The polarity of the magnetic field is determined by the direction of the electric current and the magnetic field disappears when the current ceases. Following are a couple of examples in which arrays of electromagnets are used to produce a first magnetic field emission structure that is moved over time relative to a second magnetic field emission structure which is associated with an object thereby causing the object to move.

Figure 7:
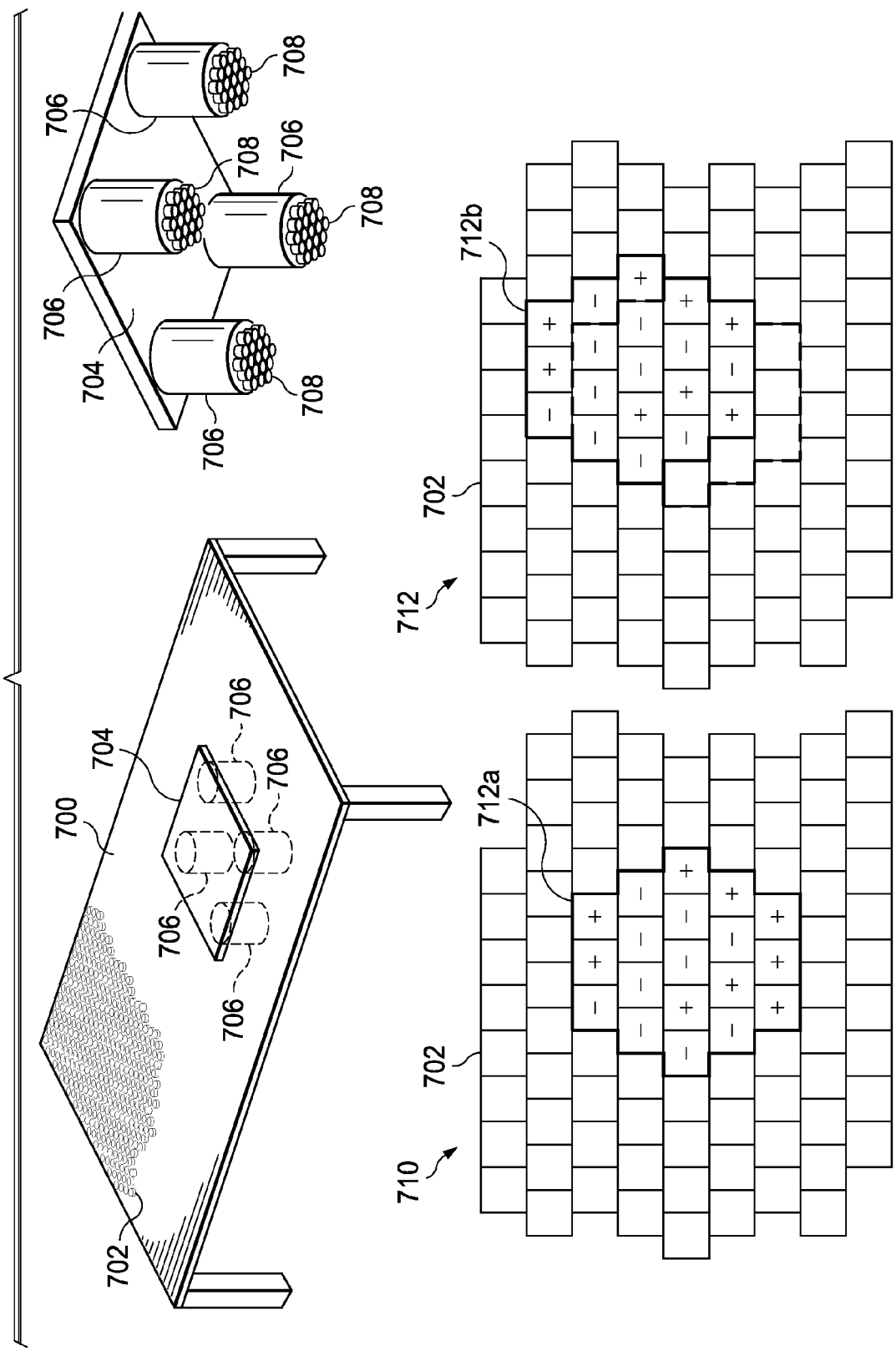

Referring to FIG. 7, there are several diagrams used to explain a 2-D correlated electromagnetics example in which there is a table 700 having a two-dimensional electromagnetic array 702 (first magnetic field emission structure 702) beneath its surface and a movement platform 704 having at least one table contact member 706. In this example, the movement platform 704 is shown having four table contact members 706 each having a magnetic field emission structure 708 (second magnetic field emission structures 708) that would be attracted by the electromagnetic array 702. Computerized control of the states of individual electromagnets of the electromagnet array 702 determines whether they are on or off and determines their polarity. A first example 710 depicts states of the electromagnetic array 702 configured to cause one of the table contact members 706 to attract to a subset 712a of the electromagnets within the magnetic field emission structure 702. A second example 712 depicts different states of the electromagnetic array 702 configured to cause the one table contact member 706 to be attracted (i.e., move) to a different subset 712b of the electromagnets within the field emission structure 702. Per the two examples, one skilled in the art can recognize that the table contact member's) 706 can be moved about table 700 by varying the states of the electromagnets of the electromagnetic array 702.

Figure 8:
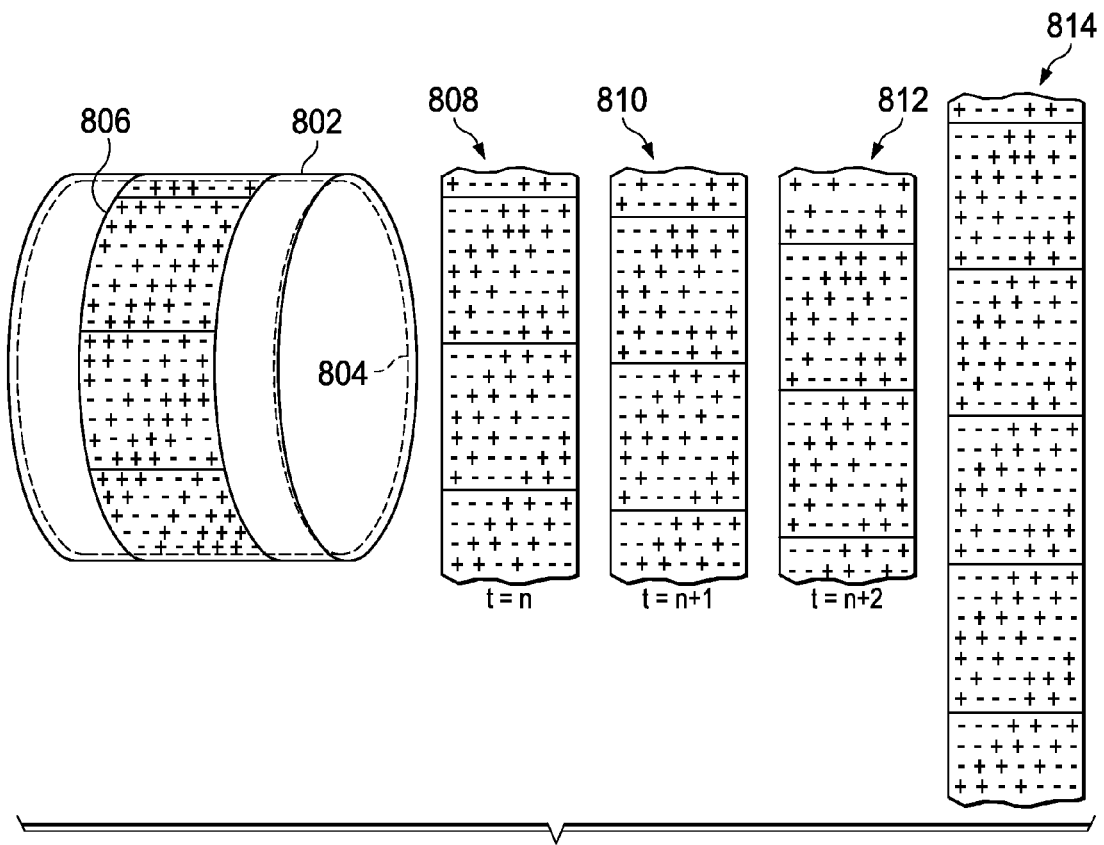

Referring to FIG. 8, there are several diagrams used to explain a 3-D correlated electromagnetics example where there is a first cylinder 802 which is slightly larger than a second cylinder 804 that is contained inside the first cylinder 802, A magnetic field emission structure 806 is placed around the first cylinder 802 (or optionally around the second cylinder 804). An array of electromagnets (not shown) is associated with the second cylinder 804 (or optionally the first cylinder 802) and their states are controlled to create a moving mirror image magnetic field emission structure to which the magnetic field emission structure 806 is attracted so as to cause the first cylinder 802 for optionally the second cylinder 804) to rotate relative to the second cylinder 804 (or optionally the first cylinder 802). The magnetic field emission structures 808, 810, and 812 produced by the electromagnetic array on the second cylinder 804 at time t=n, t=+n+1, and t=n+2, show a pattern mirroring that of the magnetic field emission structure 806 around the first cylinder 802. The pattern is shown moving downward in time so as to cause the first cylinder 802 to rotate counterclockwise. As such, the speed and direction of movement of the first cylinder 802 (or the second cylinder 804) can be controlled via state changes of the electromagnets making up the electromagnetic array. Also depicted in FIG. 8 there is an electromagnetic array 814 that corresponds to a track that can be placed on a surface such that a moving mirror image magnetic field emission structure can be used to move the first cylinder 802 backward or forward on the track, using the same code shift approach shown with magnetic field emission structures SOS, 810, and 812 (compare to FIG. 5).

Figure 9:
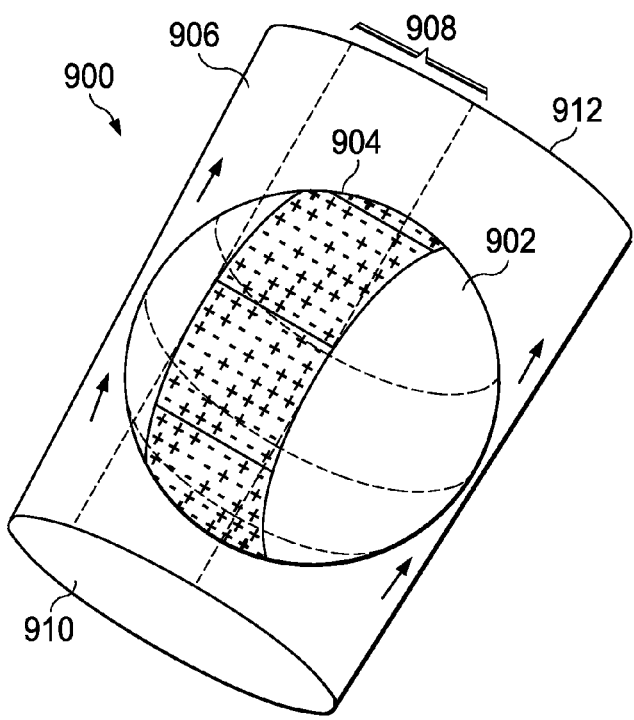

Referring to FIG. 9, there is illustrated an exemplary valve mechanism 900 based upon a sphere 902 (having a magnetic field emission structure 904 wrapped thereon) which is located in a cylinder 906 (having an electromagnetic field emission structure 908 located thereon). In this example, the electromagnetic field emission structure 908 can be varied to move the sphere 902 upward or downward in the cylinder 906 which has a first opening 910 with a circumference less than or equal to that of the sphere 902 and a second opening 912 having a circumference greater than the sphere 902. This configuration is desirable since one can control the movement of the sphere 902 within the cylinder 906 to control the flow rate of a gas or liquid through the valve mechanism 900. Similarly, the valve mechanism 900 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognize that many different types of seal mechanisms that include gaskets, o-rings, and the like can be employed with the use of the correlated magnets. Plus, one skilled in the art will recognize that the magnetic field emission structures can have an array of sources including, for example, a permanent magnet, an electromagnet, an electret, a magnetized ferromagnetic material, a portion of a magnetized ferromagnetic material, a soft magnetic material, or a superconductive magnetic material, some combination thereof and so forth.

Correlated Magnetic Suit

Referring to FIGS. 10-13, there are diagrams illustrating an exemplary correlated magnetic scuba suit 1000 (e.g., scuba wetsuit 1000, scuba drysuit 1000) in accordance with an embodiment of the present invention. The suit 1000 of the present invention is described as being configured like a scuba suit (e.g., scuba wetsuit, scuba drysuit) on which one or more objects 100S (e.g. tool 1008a, equipment bag 1008b, hood 1008c, gloves 1008d, flippers 1008e) can be secured thereto and removed therefrom. However, it should be understood that a similar correlated magnetic suit could be configured for a wide-variety of applications including, for example, a construction suit, a bio-hazard suit, a medical suit a fire fighter suit, or an astronaut suit on which one or more objects can be secured thereto and removed therefrom. Accordingly, the correlated magnetic stilt 1000 and method for enabling one or more objects 1008 to be secured to and removed from the correlated magnetic suit 1000 should not be construed in a limited manner.

Figure 10A:
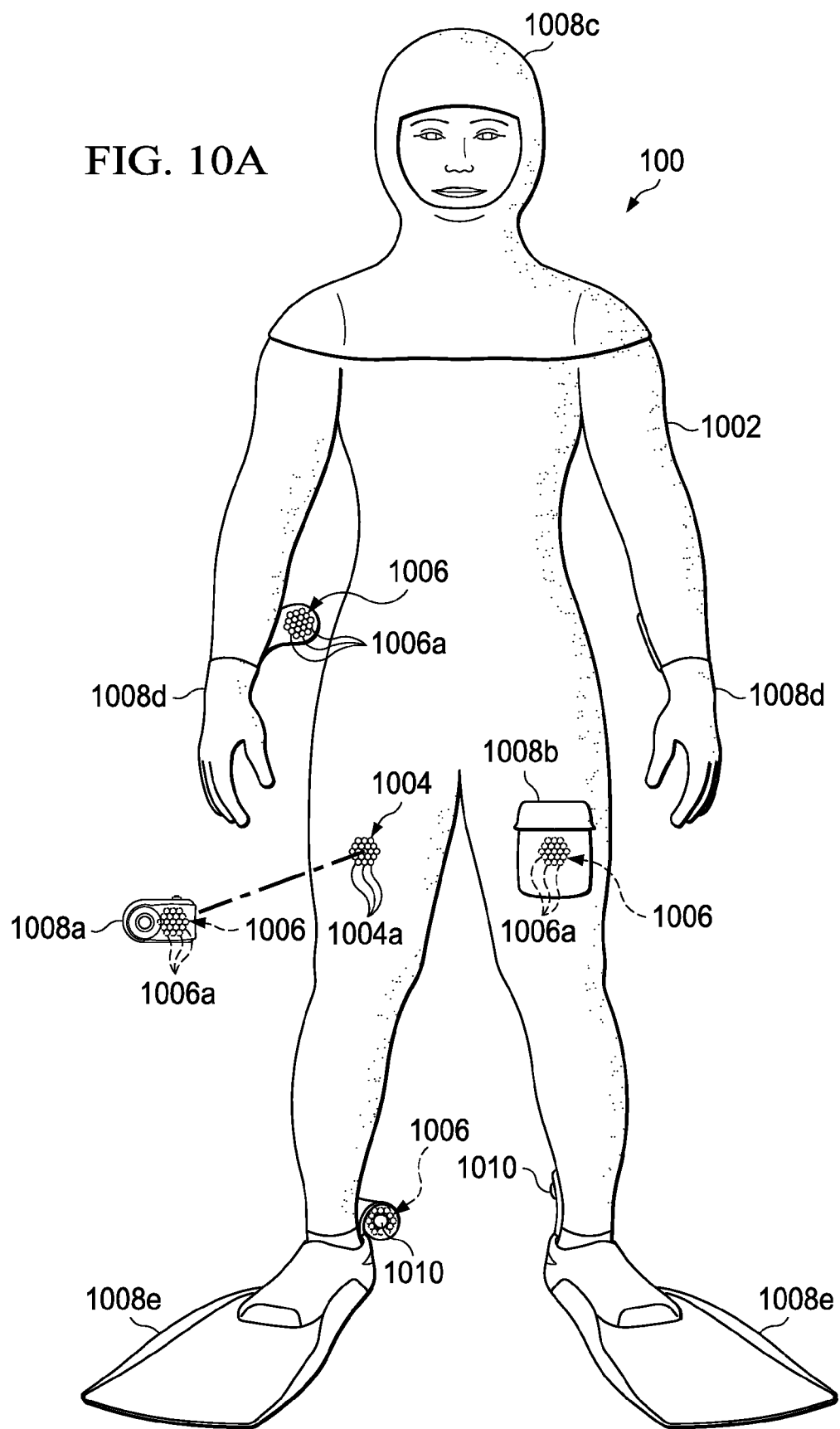
Figure 10C:
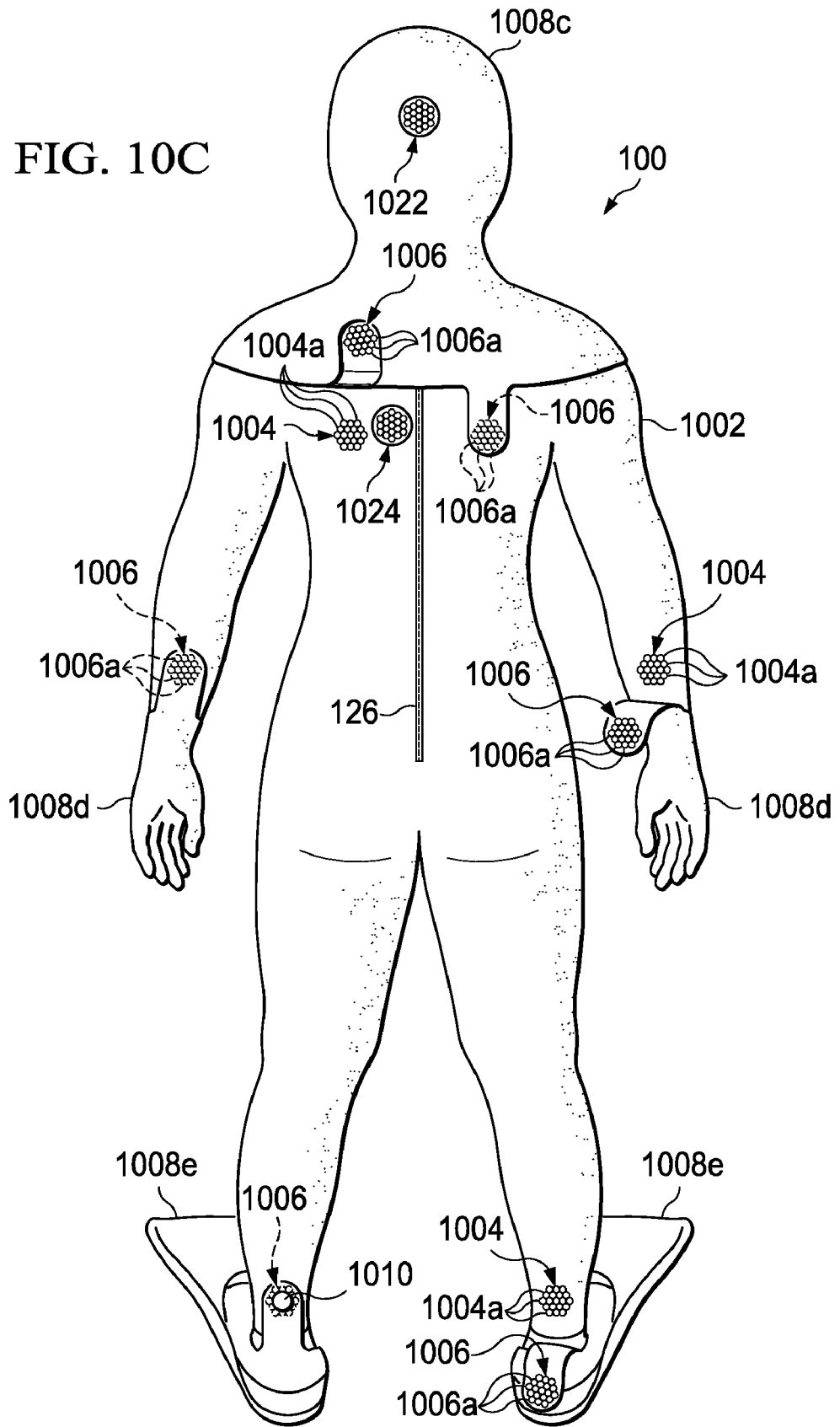

As shown in FIGS. 10A-10C, the correlated magnetic scuba suit 1000 (e.g., scuba wetsuit 1000, scuba drysuit 1000) includes a protective material 1002 which is configured to cover at least a portion of the body of a person and also has attached thereto (incorporated therein) one or more first magnetic field emission structures 1004. In this example, the first field emission structures 1004 are shown as extending out from the protective material 1002. Alternatively, the first field emission structures 1004 could be flush with the protective material 1002. Or, the first field emission structures 1004 could be recessed within the protective material 1002 such that they are not visible. The first magnetic field emission structures 1004 are configured to interact with one or more second magnetic field emission structures 1006 which are attached to (incorporated therein) to one or more objects 1008 such that when desired anyone of the objects 1008 can be attached (secured) to or removed from the protective material 1002. In this example, the second field emission structures 1006 are shown as extending out from the object 1008. Alternatively, the second field emission structures 1006 could be flush with the object 1008. Or, the second field emission structures 1006 could be recessed within the object 1008 such that they are not visible. In the scuba environment, the objects 1008 can be a wide-variety to items such as, for example, a tool 1008a (e.g., camera 1008a), an equipment bag 1008b, a hood 1008c, a glove 1008d, and a flipper 1008e (or boot 1008e).

The first magnetic field emission structure 1004 is configured to interact (correlate) with the second magnetic field emission structure 1006 such that the corresponding object 1008 can, when desired, be substantially aligned to become attached (secured) to the protective material 1002 or misaligned to become removed (detached) from the protective material 1002. In particular, the object 1008 can be attached to the protective material 1002 when their respective first and second magnetic field emission structures 1004 and 1006 are located next to one another and have a certain alignment with respect to one another. Under one arrangement, the object 1008 would be attached to the protective material 1002 with a desired strength to prevent the object 1008 from being inadvertently disengaged from the protective material 1002. The object 1008 can be released from the protective material 1002 when their respective first and second magnetic field emission structures 1004 and 1006 are turned with respect to one another. In this example, the object 1008 (e.g., flippers 1008e) may have an optional release mechanism 1010 that can be used to turn the second magnetic field emission structure 1006 with respect to the first magnetic field emission structure 1004 so as to release or attach the object 1008 from or to the protective material 1002 (see FIGS. 11-12).

The process of attaching and detaching the object 1008 to and from the protective material 1002 is possible because the first and second magnetic field emission structures 1004 and 1006 each include an array of field emission sources 1004a and 1006a (e.g., an array of magnets 1004a and 1006a) and each array has sources with positions and polarities relating to a desired spatial force function that corresponds to a relative alignment of the first and second magnetic field emission structures 1004 and 1006 within a field domain (see discussion about correlated magnet technology). In this example, the first and second magnetic field emissions structures 1004 and 1006 both have the same code but are a mirror image of one another (see FIGS. 4 and 11A-11I). It should be appreciated that the first and second field emission structures 1004 and 1006 and other field emission structures illustrated herein are themselves exemplary. Generally, the first and second field emission structures 1004 and 1006 and other field emission structures could have many different configurations and could be many different types of permanent magnets, electromagnets, and/or electro-permanent magnets where their size, shape, source strengths, coding, and other characteristics can be tailored to meet different requirements. An example of how the object 1008 (e.g., flipper 1008e) can be attached (secured) to or removed from the protective material 1002 with the aid of the optional release mechanism 1010 is discussed in detail below with respect to FIGS. 11A-11I.

Figure 11G:
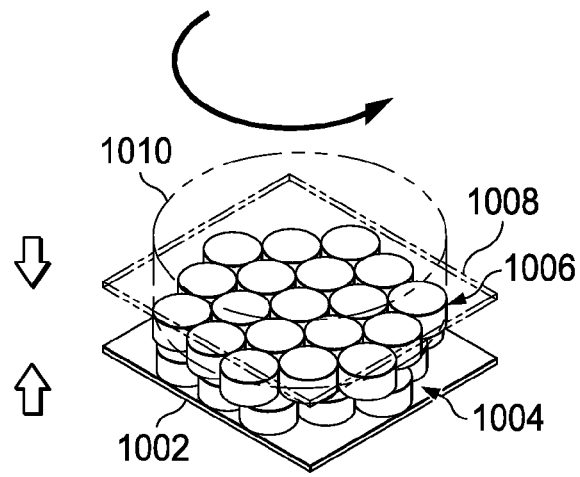
Figure 11H:
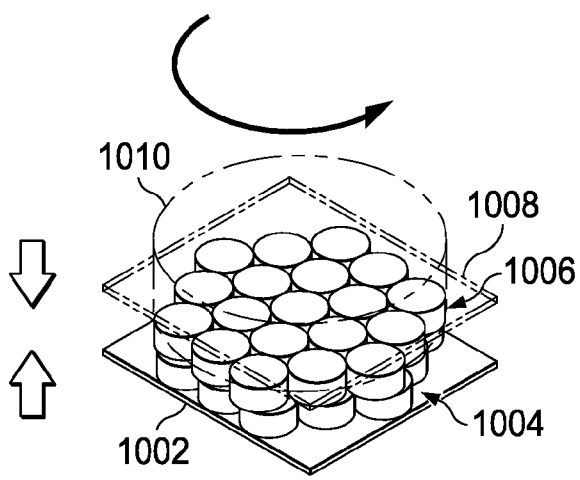
Figure 11I:
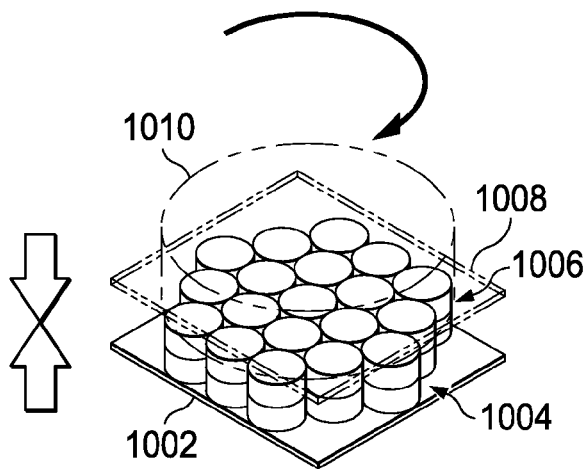

Referring to FIGS. 11A-11I there is depicted an exemplary selected first magnetic field emission structure 1004 (associated with the protective material 1002) and its mirror image second magnetic field emission structure 1006 (associated with the object 1008) and the resulting spatial forces produced in accordance with their various alignments as they are twisted relative to each other which enables one to attach or remove the object 1008 to or from the protective material 1002. In FIG. 11A, the second magnetic field emission structure 1006 (attached to the optional release mechanism 1010) and the mirror image first magnetic field emission structure 1004 are aligned producing a peak spatial force. In FIG. 11B, the second magnetic field emission structure 1006 is rotated by the release mechanism 1010 clockwise slightly relative to the mirror image first magnetic field emission structure 1004 and the attractive force reduces significantly. In this example, the object 1008 itself is not rotated but the release mechanism 1010 is used to rotate the second magnetic field emission structure 1006. Of course, if the release mechanism 1010 is not used then the person could grab a part of the object 1008 and twist it to rotate the second magnetic field emission structure 1006 relative to the first magnetic field emission structure 1004. In FIG. 11C, the second magnetic field emission structure 1006 is further rotated by the release mechanism 1010 and the attractive force continues to decrease. In FIG. 11D, the second magnetic field emission structure 1006 is still further rotated by the release mechanism 1010 until the attractive force becomes very small, such that the two magnetic field emission structures 1004 and 1006 are easily separated as shown in FIG. 11E. One skilled in the art would also recognize that the object 1008 and the protective material 1002 can also be detached by applying a pull force, shear force, or any other force sufficient to overcome the attractive peak spatial force between the substantially aligned first and second field emission structures 1004 and 1006. Given the two magnetic field emission structures 1004 and 1006 are held somewhat apart as in FIG. 11E, the two magnetic field emission structures 1004 and 1006 can be moved closer and rotated towards alignment producing a small spatial force as in FIG. 11F. The spatial force increases as the two magnetic field emission structures 1004 and 1006 become more and more aligned in FIGS. 11G and 11H and a peak; spatial force is achieved when aligned as in FIG. 11I. It should be noted that the direction of rotation was arbitrarily chosen and may be varied depending on the code employed. Additionally, the first and second magnetic field emission structures 1004 and 1006 are mirror images of one another which results in an attractive peak spatial force (see also FIGS. 3-4). This way of securing and removing the object 1008 to and from the protective material 1002 is a marked-improvement over the prior art in which the conventional loops, buckles, clamps, hooks, or other known fastening mechanisms would have been used which require a great degree of dexterity on the part of the person when they want to secure or remove objects to or from the scuba suit.

Figure 12A:
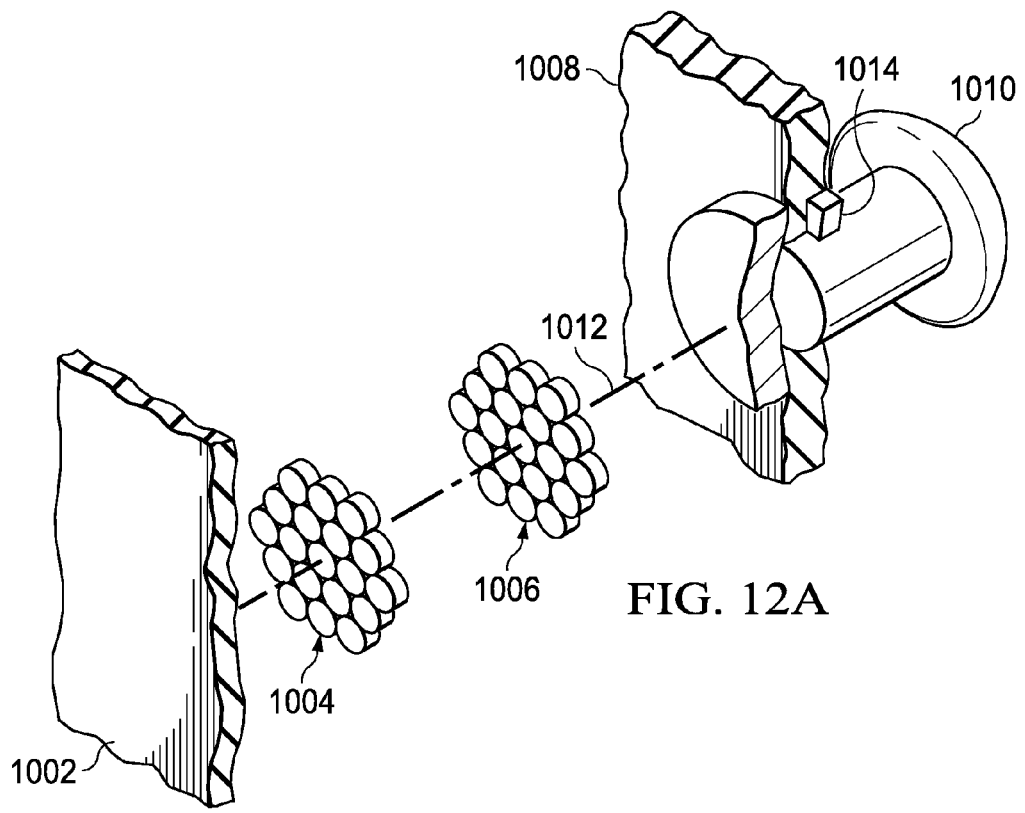
FIGS. 12A-12C illustrate several diagrams of an exemplary release mechanism that can be incorporated within anyone of the objects shown in FIGS. 10A-10C in accordance with an embodiment of the present invention.
Figure 12B:
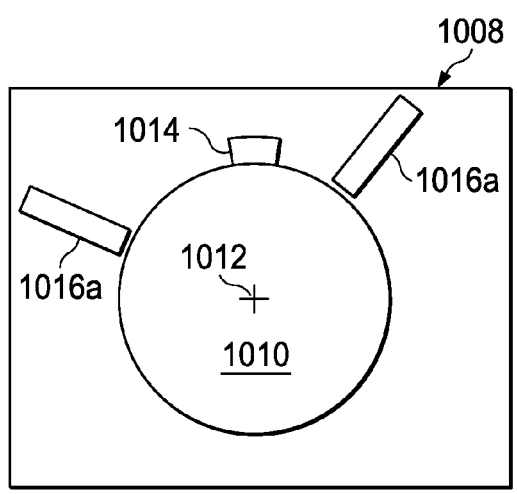
Figure 12C:
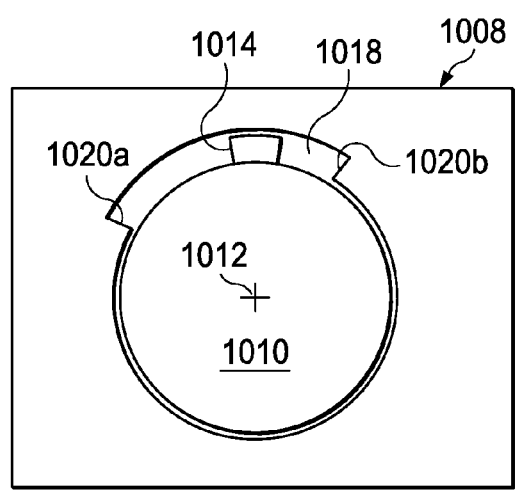

The object 1008 (e.g., flipper 1008e) is described above as having a release mechanism 1010 (e.g., turn-knob 1010) which is used to turn the second magnetic field emission structure 1006 relative to the mirror image first magnetic field emission structure 1004. FIGS. 12A-12C are several diagrams that illustrate an exemplary release mechanism 1010 (e.g., turn-knob 1010) that could be used in accordance with an embodiment of the present invention. In FIG. 12A, a portion of the object 1008 which incorporates the second magnetic field emission structure 1006 is shown along with a portion of the protective material 1002 which incorporates the first magnetic field emission structure 1004. The second magnetic field emission structure 1006 is physically secured to the release mechanism 1010. The release mechanism 1010 and the second magnetic field emission structure 1006 are also configured to turn about axis 1012 with respect to and within the object 1008 allowing them to rotate such that the second magnetic field emission structure 1006 can be attached to and separated from the first magnetic field emission structure 1004 which enables the object 1008 to be connected to and separated from the protective material 1002. Typically, the release mechanism 1010 and the second magnetic field emission structure 1006 would be turned by the user's hand. If desired, the release mechanism 1010 can include at least one tab 1014 which is used to stop the movement of the second magnetic field emission structure 1006 relative to the first magnetic field emission structure 1004. In FIG. 12B, there is depicted a general concept of using the tab 1014 to limit the movement of the second magnetic field emission structure 1006 between two travel limiters 1016a and 1016b which protrude up from the object 1008. The two travel limiters 1016a and 1016b might be any fixed objects placed at desired locations on the object 1008 where for instance they limit the turning radius of the release mechanism 1010 and the second magnetic field emission structure 1006. FIG. 12O depicts an alternative approach where the object 1008 has a travel channel 1018 formed therein that, is configured to enable the release mechanism 1010 (with a tab 1014) and the second magnetic field emission structure 1006 to turn about the axis 1012 where the travel limiters 1020a and 1020b limit the fuming radius. For example, when the tab 1014 is stopped by travel limiter 1020a (or travel limiter 1016a) then the object 1008 can be separated from the protective material 1002, and when the tab 1014 is stopped by travel limiter 1020b (or travel limiter 1016b) then the object 1008 is secured to the protective material 1002. It should be appreciated that the release mechanism 1010 can have many different configurations instead of the turn-knob such as a flat surface with a groove size to fit a coin-tool so the person can turn the second magnetic field emission structure 1006 or a depression in which a person can place their finger to turn the second magnetic field emission structure 1006.

In operation, the user could pick-up the object 1008 which incorporates the second magnetic field emission structure 1006. The user would then move the object 1008 towards the protective material 1002 which incorporates the first magnetic field emission structure 1004. Then, the user would align the first and second magnetic field emission structures 1004 and 1006 such that the object 1008 can be attached to the protective material 1002. In particular, the first and second magnetic field emission structures 1004 and 1006 would be attached to one another when the first and second magnetic field emission structures 1004 and 1006 are located next to one another and have a certain alignment with respect to one another where they correlate with each other to produce a peak attractive force. The user can release the object 1008 from the protective material 1002 by turning the second magnetic field emission structure 1006 relative to the first magnetic field emission structure 1004 so as to misalign the two field emission structures 1004 and 1006. In the exemplary scenario, the user could whenever desired attach or release an object 1008 such as, for example, a tool 1008a, equipment bag 1008b, a hood 1008c, a glove 1008d, and/or a flipper 1008e to or from the protective material 1002.

The process for attaching and detaching the object 1008 to and from the protective material 1002 is possible because each of the first and second magnetic field emission structures 1004 and 1006 includes an array of field emission sources 1004a and 1006a each having positions and polarities relating to a desired spatial force function that corresponds to a relative alignment of the first and second magnetic field emission structures 1004 and 1006 within a field domain. Each field emission source of each array of field emission sources 1004a and 1006a has a corresponding field emission amplitude and vector direction determined in accordance with the desired spatial force function, where a separation distance between the first and second magnetic field emission structures 1004 and 1006 and the relative alignment of the first and second magnetic field emission structures 1004 and 1006 creates a spatial force in accordance with the desired spatial force function. The field domain corresponds to first field emissions from the array of first field emission sources 1004a of the first magnetic field emission structure 1004 interacting with second field emissions from the array of second field emission sources 1006a of the second magnetic field emission structure 1006.

If desired, one or more objects 1008 can each have attached thereto (or incorporated therein) a third magnetic field emission structure 1022 and the protective material 1002 (or the object(s) 1008 themselves) can have one or more mirror image fourth magnetic field emission structures 1024 attached thereto (or incorporated therein) (see hood 1008c illustrated in FIGS. 10B and 10C). For instance, the third magnetic field emission structure 1022 can be attached to one of the fourth magnetic field emission structures 1024 so that one end of the corresponding object 1008 does not hang loose when the first and second magnetic field emission structures 1004 and 1006 are attached to one another. If desired, the third and fourth magnetic field emission structures 1022 and 1024 may be coded and/or configured such that they will not interact with the first and second magnetic field emission structures 1004 and 106 but they would function in a similar manner. In the present example, the hood 1008e is shown having the third magnetic field emission structure 1022 which could be secured to the fourth magnetic field emission structure 1024 in the protective suit 1002 (see FIG. 10C).

Alternatively, the protective material 1002 and each of the objects 108 can have their own unique pair of mirror imaged magnetic field emission structures with their own unique configuration and/or coding. In this case, one object 108 with a different magnetic field emission structure would interact with the corresponding mirror image magnetic field emission structure in the protective material 1002 but not interact with the other magnetic field emission structures in the protective material 1002. This is desirable since it allows only certain objects 1008 to be secured to certain locations on the protective material 1002. Plus, certain objects 1008 may be heavier than other objects 1008 which would require a different configuration of the magnetic field emission structures so that they can still be secured to and removed from the protective material 1002.

Figure 13A:
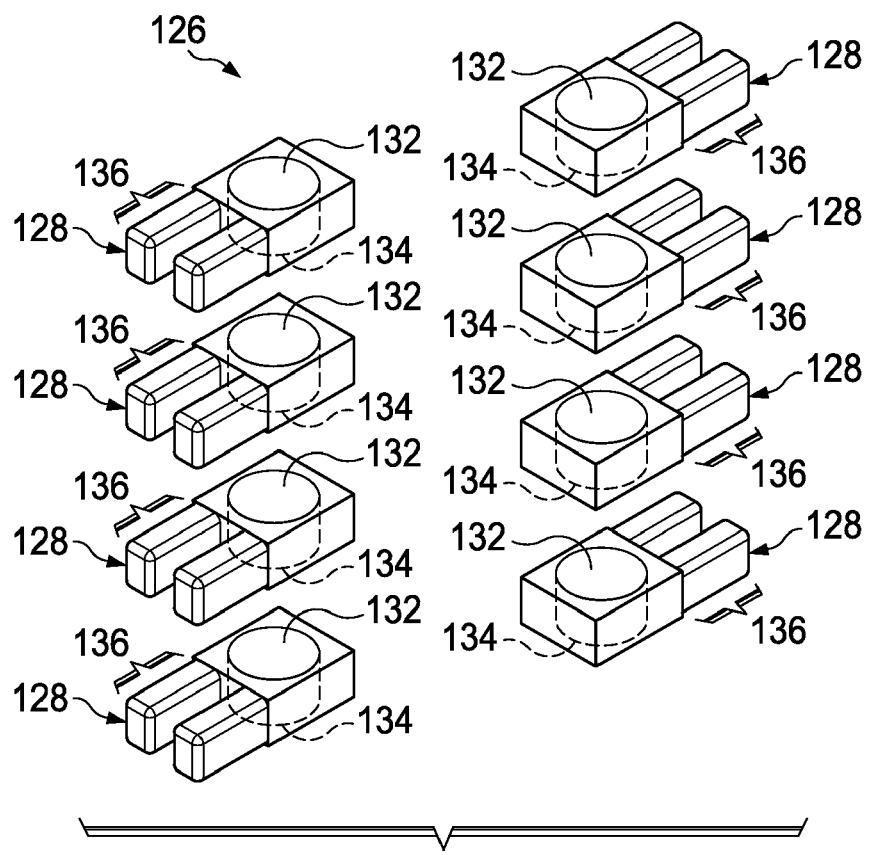
Figure 13B:
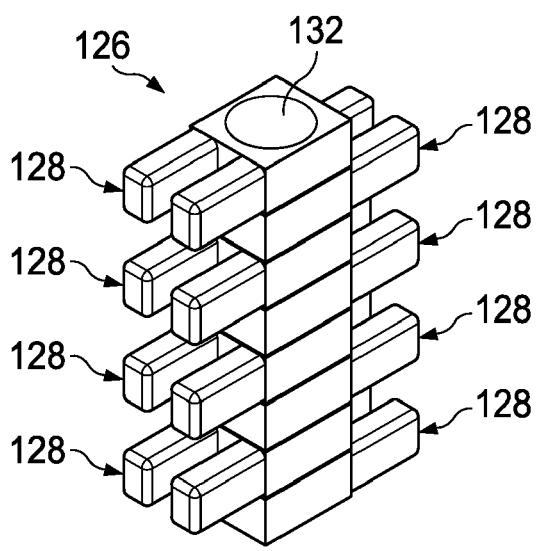
Figure 13D:
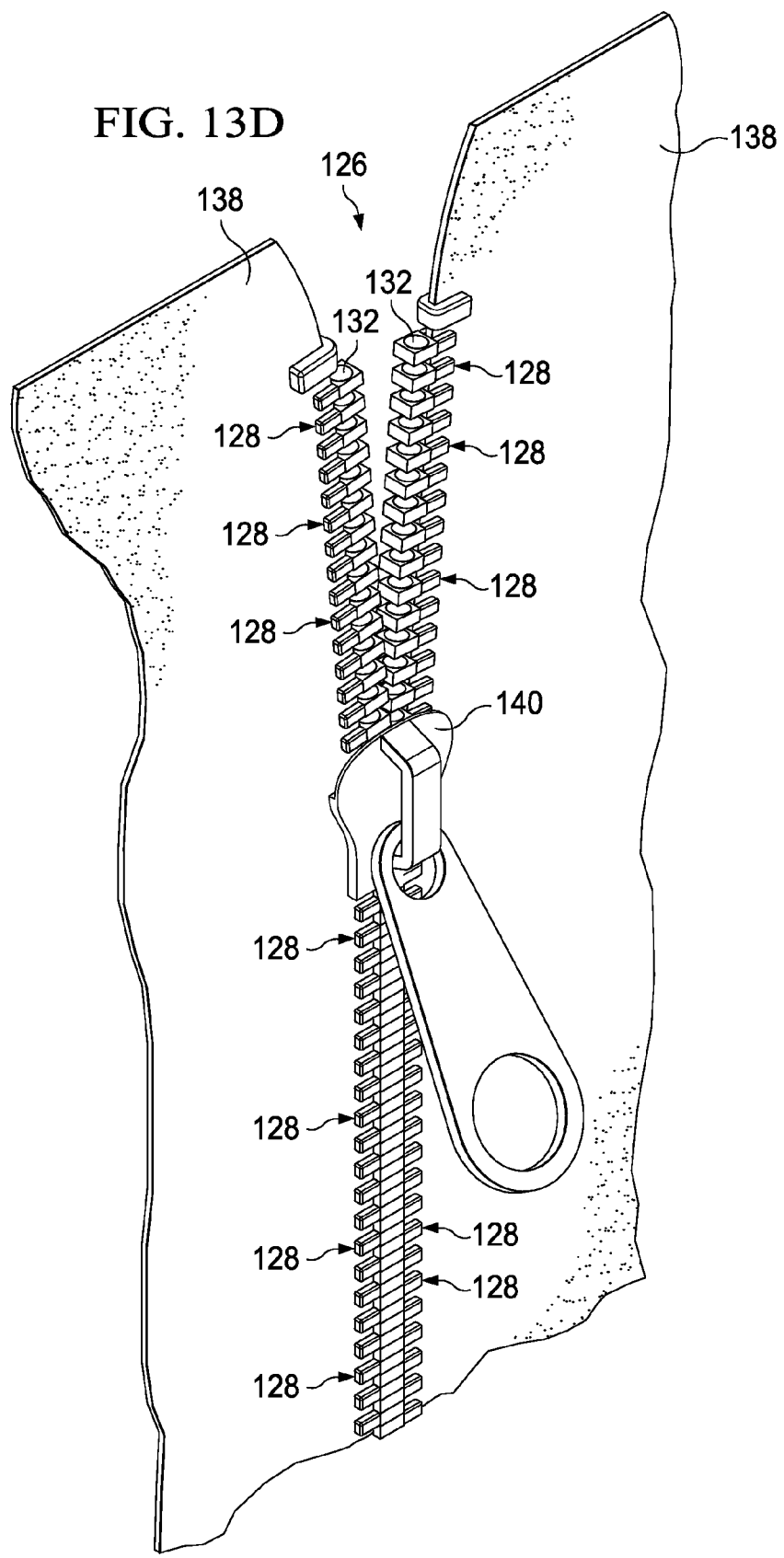

If desired, the protective material 1002 may include one or more correlated magnetic zippers 126 where each zipper would include a plurality of zipper teeth each having a first zipper field emission structure on a top surface and a second zipper field emission structure on a bottom surface, where the first zipper field emission structure is a mirror image of the second zipper field emission structure. FIGS. 13A-13D depict an exemplary correlated magnetic zipper 126 in accordance with an embodiment of the present invention. As shown, the correlated magnetic zipper 126 includes a plurality of zipper teeth 128 each having a correlated magnetic structure 132-134 that is coded in accordance with a desired code. As shown, the top surface 132 of the teeth 128 are all coded the same and the bottom surface 134 of the teeth 128 would have the mirror image of the code as seen from the top of the teeth 128. Bach of the teeth 128 also has a garment attachment mechanism 136 that enables the corresponding tooth 128 to be attached to a garment 138 (see FIGS. 13C and 13D). FIG. 13B depicts the zipper 126 when the teeth 128 have been aligned such that the teeth 128 correlate and attach to each other FIG. 13C depicts the detachment process whereby the garment 138 can be twisted on at least one side of the zipper 126 and pulled apart to cause the teeth 128 to turn one by one so as to cause the zipper 126 to open. FIG. 13D depicts an exemplary zipper slider 140 that can be used to bring the two sides of the zipper 126 together or to separate them. A mechanism can also be used to prevent the teeth 128 from detaching accidentally. One skilled in the art will recognize the top and bottom surfaces 132 and 134 of the zipper teeth 128 can be coded differently than described above, for example, the top and bottom surfaces 132 and 134 of the zipper teeth 128 can have the same code whereby a intermediate layer may be required depending on the thickness of the zipper teeth.

In another optional feature of the present invention, the user of the correlated magnetic suit 1000 can remove therefrom one or more objects 1008 and attach those objects 1008 to other surfaces or objects within an environment having appropriate magnetic field emission structures. For example, the user of the scuba suit 1000 can remove the tool 1008a, the equipment bag 1008b, the hood 1008c, the gloves 1008d, and/or the flippers 1008e and attach them to a side of a boat or on a wall in a dive shop-garage which has the appropriate magnetic field emission structures. In another example, the user of the correlated magnetic suit 1000 can remove a tool which has a magnetic field emission structure incorporated thereon such as a flashlight and attach the flashlight to a location for instance on an underwater oil platform etc. which has an appropriate magnetic field emission structure. Plus, the correlated magnetic suit 1000 itself can have one or more magnetic field emission structures incorporated therein that enables it to be attached to other surfaces or objects within an environment such as the side of a boat, on the wall in a dive shop-garage, or any other location which has the appropriate magnetic field emission structure(s). Even display racks in stores can incorporate the appropriate magnetic field emission structures to support the correlated magnetic suit 1000 and their associated objects 1008.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A suit comprising:

a protective material including a first field emission structure; and an object including a second field emission structure, where the object is attached to the protecting material when the first and second field emission structures are located next to one another and have a certain alignment with respect to one another, where each of the first and second field emission structures include a plurality of field emission sources having positions and polarities relating to a desired spatial force function that corresponds to a relative alignment of the first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

2. The suit of claim 1, wherein the object is released from the protective material when the first field emission structure and the second field emission structures are turned with respect to one another.

3. The suit of claim 1, wherein the object further includes a release mechanism which is used to turn the second field emission structure with respect to the first field emission structure.

4. The suit of claim 1, wherein the object includes a third field emission structure and the protective material includes a fourth field emission structure, where the object is attached to the protecting material when the third and fourth field emission structures are located next to one another and have a certain alignment with respect to one another, where each of the third and fourth field emission structures include a plurality of field emission sources having positions and polarities relating to a second desired spatial force function that corresponds to a relative alignment of the third and fourth field emission structures within a second field domain.

5. The suit of claim 1, wherein the object is a selected one of a tool, an equipment bag, a hood, a glove, a boot, and a flipper.

6. The suit of claim 1, further comprising a plurality of objects each including one or more additional field emission structures and the protective material includes one or more additional field emission structures.

7. The suit of claim 1, wherein the protective material includes a zipper with a plurality of zipper teeth each having a first zipper field emission structure on a top surface and having a second zipper field emission structure on a bottom surface, where the first zipper field emission structure is a mirror image of the second zipper field emission structure.

8. The suit of claim 1, wherein said positions and said polarities of each of the plurality of field emission sources are determined in accordance with at least one correlation function.

9. The suit of claim 8, wherein said at least one correlation function is in accordance with at least one code.

10. The suit of claim 9, wherein said at least one code is at least one of a pseudorandom code, a deterministic code, or a designed code.

11. The suit of claim 9, wherein said at least one code is one of a one dimensional code, a two dimensional code, a three dimensional code, or a four dimensional code.

12. The suit of claim 1, wherein each of said field emission sources has a corresponding field emission amplitude and vector direction determined in accordance with the desired spatial force function, wherein a separation distance between the first and second field emission structures and the relative alignment of the first and second field emission structures creates a spatial force in accordance with the desired spatial force function.

13. The suit of claim 12, wherein said spatial force include at least one of an attractive spatial force or a repellant spatial force.

14. The suit of claim 12, wherein said spatial force corresponds to a peak spatial force of said desired spatial force function when said first and second field emission structures are substantially aligned such that each field emission source of said first field emission structure substantially aligns with a corresponding field emission source of said second field emission structure.

15. The suit of claim 1, wherein said field domain corresponds to first field emissions from said field emission sources of said first field emission structure interacting with second field emissions from said second field emission sources of said second field emission structure.

16. The suit of claim 1, wherein said polarities of the field emission sources include at least one of North-South polarities or positive-negative polarities.

17. The suit of claim 1, wherein at least one of said field emission sources includes a magnetic field emission source or an electric field emission source.

18. The suit of claim 1, wherein at least one of said field emission sources include a permanent magnet, an electromagnet, an electret, a magnetized ferromagnetic material, a portion of a magnetized ferromagnetic material, a soft magnetic material, or a superconductive magnetic material.

19. A method for enabling an object to be attached to and removed from a suit, said method comprising the steps of:
   attaching a first field emission structure to the suit;
   attaching a second field emission structure to the object; and
   aligning the first and second field emission structures so the object attaches to the suit when the first and second field emission structures are located next to one another, where each of the first and second field emission structures include a plurality of field emission sources having positions and polarities relating to a desired spatial force function that corresponds to a relative alignment of the first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

20. The method of claim 19, further comprising a step of turning the first emission structure with respect to the second field emission structure to remove the object from the suit.

21. The method of claim 19, wherein the suit is a selected one of a scuba suit, a construction suit, a bio-hazard suit, a medical suit, a fire fighter suit, and an astronaut suit.

22. The method of claim 19, wherein the object is a selected one of a tool, an equipment bag, a hood, a glove, a boot, and a flipper.

23. A suit adapted to have an object secured thereto and the object removed therefrom, said suit comprising:
   a protective material; and
   a first field emission structure attached to said protective material, said first field emission structure interacting with a second field emission structure associated with the object, where the object is attached to the protecting material when the first and second field emission structures are located next to one another and have a certain alignment with respect to one another, where the object is released from the protective material when the first field emission structure and the second field emission structures are turned with respect to one another, where each of the first and second field emission structures include a plurality of field emission sources having positions and a polarities relating to a desired spatial force function that corresponds to a relative alignment of the first and second field emission structures within a field domain, said spatial force function being in accordance with a code, said code corresponding to a code modulo of said first plurality of field emission sources and a complementary code modulo of said second plurality of field emission sources, said code defining a peak spatial force corresponding to substantial alignment of said code modulo of said first plurality of field emission sources with said complementary code modulo of said second plurality of field emission sources, said code also defining a plurality of off peak spatial forces corresponding to a plurality of different misalignments of said code modulo of said first plurality of field emission sources and said complementary code modulo of said second plurality of field emission sources, said plurality of off peak spatial forces having a largest off peak spatial force, said largest off peak spatial force being less than half of said peak spatial force.

* * * * *